(12) United States Patent
Zaima et al.

(10) Patent No.: US 12,142,436 B2
(45) Date of Patent: Nov. 12, 2024

(54) MULTI-LAYER CERAMIC ELECTRONIC COMPONENT AND CIRCUIT BOARD

(71) Applicant: TAIYO YUDEN CO., LTD., Tokyo (JP)

(72) Inventors: Tomohiko Zaima, Tokyo (JP); Takashi Sasaki, Tokyo (JP); Atsuhiro Kogure, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 107 days.

(21) Appl. No.: 17/881,315

(22) Filed: Aug. 4, 2022

(65) Prior Publication Data

US 2023/0077511 A1 Mar. 16, 2023

(30) Foreign Application Priority Data

Sep. 13, 2021 (JP) ................................. 2021-148693

(51) Int. Cl.
| | |
|---|---|
| *H01G 4/30* | (2006.01) |
| *H01G 2/06* | (2006.01) |
| *H01G 4/012* | (2006.01) |
| *H01G 4/12* | (2006.01) |
| *H01G 4/232* | (2006.01) |

(52) U.S. Cl.
CPC ............... *H01G 4/30* (2013.01); *H01G 2/065* (2013.01); *H01G 4/012* (2013.01); *H01G 4/12* (2013.01); *H01G 4/232* (2013.01)

(58) Field of Classification Search
CPC .......... H01G 4/30; H01G 2/065; H01G 4/012; H01G 4/232; H10G 4/12
USPC ...................... 361/301.4, 306.3, 321.3, 321.1
See application file for complete search history.

(56) References Cited

U.S. PATENT DOCUMENTS

| | | | | |
|---|---|---|---|---|
| 10,262,798 | B2 * | 4/2019 | Sasaki | H01G 4/232 |
| 11,430,609 | B2 * | 8/2022 | Yamamoto | H01G 4/008 |
| 2008/0074826 | A1 * | 3/2008 | Lee | H01G 4/30 |
| | | | | 361/306.3 |
| 2017/0098506 | A1 * | 4/2017 | Ando | H01G 4/228 |
| 2019/0131073 | A1 * | 5/2019 | Onodera | H01G 4/30 |
| 2019/0237250 | A1 * | 8/2019 | Onodera | H01G 2/065 |

FOREIGN PATENT DOCUMENTS

JP 2017-191880 A 10/2017

\* cited by examiner

*Primary Examiner* — Arun Ramaswamy
(74) *Attorney, Agent, or Firm* — Stein IP LLC

(57) ABSTRACT

A multi-layer ceramic electronic component includes: a ceramic body having a substantially rectangular parallelepiped shape, the ceramic body including a first corner connecting a first main surface, a first side surface, and an end surface, a second corner connecting a second main surface, the first side surface, and the end surface, a third corner connecting the first main surface, a second side surface, and the end surface, a fourth corner connecting the second main surface, the second side surface, and the end surface, and a plurality of internal electrodes; and a pair of external electrodes each including a base layer and a first conductive resin layer including a first side surface resin portion disposed on the first side surface to cover the first corner and extending from the first corner to first and second axis directions, and covers at least a part of the base layer.

8 Claims, 20 Drawing Sheets

MULTI-LAYER CERAMIC ELECTRONIC COMPONENT AND CIRCUIT BOARD

CROSS-REFERENCE TO RELATED APPLICATIONS

This application claims the benefit of Japanese Application No. 2021-148693, filed Sep. 13, 2021, in the Japanese Patent Office. All disclosures of the document named above are incorporated herein by reference.

BACKGROUND ART

The present disclosure relates to a multi-layer ceramic electronic component including an external electrode and to a circuit board.

Multi-layer ceramic electronic components such as multi-layer ceramic capacitors are also widely used in in-vehicle equipment with the trend toward electronic control of automobiles. For example, in the in-vehicle equipment, a circuit board on which a multi-layer ceramic electronic component is mounted may be disposed in environments where the temperature change is very large. If the circuit board is subjected to a large temperature change, the substrate undergoes thermal expansion and thermal contraction, which may cause deflection stress in the multi-layer ceramic electronic component. For example, Japanese Patent Application Laid-open No. 2017-191880 discloses a multi-layer ceramic electronic component including an external electrode including a conductive resin layer having a high deflection strength from the viewpoint of suppressing the occurrence of cracks resulting from such deflection stress.

SUMMARY OF THE INVENTION

A multi-layer ceramic electronic component is generally mounted on a substrate using solder. Solder in a molten state wets and spreads upwardly on the external electrode, and then cooled to be solidified. The solder contracts in the process of solidification and gives stress to the ceramic body. When the solder accumulates at a certain location, the stress due to the solder may concentrate on that accumulation location. If the solder causes a large stress, the influence of the stress cannot be suppressed even if a conductive resin is used for the external electrode, whereby the ceramic body gets cracks and the reliability of the multi-layer ceramic electronic component is lowered.

In view of the circumstances as described above, it is desirable to provide a multi-layer ceramic electronic component and a circuit board that are capable of suppressing the generation of cracks in a ceramic body resulting from solder.

Additional or separate features and advantages of the disclosure will be set forth in the descriptions that follow and in part will be apparent from the description, or may be learned by practice of the disclosure. The objectives and other advantages of the disclosure will be realized and attained by the structure particularly pointed out in the written description and claims thereof as well as the appended drawings.

To achieve these and other advantages and in accordance with the purpose of the present disclosure, according to one embodiment of the present disclosure, there is provided a multi-layer ceramic electronic component including a ceramic body and a pair of external electrodes.

The ceramic body includes a first main surface and a second main surface that are perpendicular to a first axis, a pair of end surfaces perpendicular to a second axis orthogonal to the first axis, a first side surface and a second side surface that are perpendicular to a third axis orthogonal to the first axis and the second axis, a first corner that connects the first main surface, the first side surface, and one of the end surfaces, a second corner that connects the second main surface, the first side surface, and the end surface, a third corner that connects the first main surface, the second side surface, and the end surface, a fourth corner that connects the second main surface, the second side surface, and the end surface, and a plurality of internal electrodes laminated in a direction of the first axis or a direction of the third axis. The ceramic body is configured to have a substantially rectangular parallelepiped shape.

The pair of external electrodes each include a base layer and a first conductive resin layer.

The base layer covers the end surface.

The first conductive resin layer includes a first side surface resin portion disposed on the first side surface to cover the first corner and extending from the first corner to the direction of the first axis and a direction of the second axis, and covers at least a part of the base layer.

In the multi-layer ceramic electronic component thus configured, each external electrode includes the first conductive resin layer and thus has a high deflection strength. In addition, the first conductive resin layer includes the first side surface resin portion having an L shape, for example, the first side surface resin portion being disposed on the first side surface to cover the first corner. This configuration can guide the molten solder at the time of mounting toward the center of the first side surface from the end surface along the inner edge of the first side surface resin portion. This makes it possible to distribute the solder in a wide range of the first side surface and to reduce the stress that may occur after the solder is solidified. Therefore, the above configuration makes it possible to suppress generation of cracks in the ceramic body resulting from the solder.

Each of the pair of external electrodes may include a second conductive resin layer that includes a second side surface resin portion disposed on the first side surface to cover the second corner and extending from the second corner to the direction of the first axis and the direction of the second axis, and covers at least a part of the base layer. In this case, the second conductive resin layer may be apart from the first conductive resin layer in the direction of the first axis.

As described above, the external electrode may include the first conductive resin layer on the first main surface as well as the second conductive resin layer on the second main surface. This makes it possible to provide an effect of suppressing the stress of the solder by the side surface resin portion even when the mounting is performed with the first main surface or the second main surface facing a substrate. Therefore, the convenience at the mounting can be enhanced.

Further, the first conductive resin layer may include a first end surface resin portion disposed on the end surface to cover the first corner and extending from the first corner to the direction of the first axis and the direction of the third axis.

This makes it possible to guide the molten solder along the inner edge of the first end surface resin portion also on the end surface. Therefore, the accumulation of the solder can be suppressed also on the end surface, and the generation of cracks in the ceramic body resulting from the solder can be more reliably suppressed.

Each of the pair of external electrodes may further include a third conductive resin layer that includes a third side surface resin portion disposed on the second side surface to cover the third corner and extending from the third corner to the direction of the first axis and the direction of the second axis, and covers at least a part of the base layer, and the third conductive resin layer may be apart from the first conductive resin layer in the direction of the third axis.

As described above, the external electrode may include the first conductive resin layer on the first side surface as well as the third conductive resin layer on the second side surface.

Further in this case, the first conductive resin layer may include a first end surface resin portion disposed on the end surface to cover the first corner and extending from the first corner to the direction of the first axis and the direction of the third axis, the third conductive resin layer may include a third end surface resin portion disposed on the end surface to cover the third corner and extending from the third corner to the direction of the first axis and the direction of the third axis, and the third end surface resin portion may be apart from the first end surface resin portion in the direction of the third axis.

This makes it possible to suppress the accumulation of the solder on any of the end surface and the first and second side surfaces, and to more reliably suppress the generation of cracks in the ceramic body resulting from the solder.

For example, the base layer may further include a side surface base portion disposed on the first side surface, and the side surface base portion may have a dimension in the direction of the second axis that is 50% or less of a dimension of the first side surface resin portion in the direction of the second axis.

This makes it possible to cover the end portion of the side surface base portion with the conductive resin layer, thus reliably suppressing the generation of cracks resulting from the base layer having a lower deflection strength than the conductive resin layer.

For example, each of the pair of external electrodes may further include a plating layer that covers the base layer and the first conductive resin layer.

This facilitates mounting using the solder.

According to another embodiment of the present disclosure, there is provided a circuit board including a multi-layer ceramic electronic component and a mounting substrate including a connection electrode.

The multi-layer ceramic electronic component includes a ceramic body and a pair of external electrodes.

The ceramic body includes a first main surface and a second main surface that are perpendicular to a first axis, a pair of end surfaces perpendicular to a second axis orthogonal to the first axis, a first side surface and a second side surface that are perpendicular to a third axis orthogonal to the first axis and the second axis, a first corner that connects the first main surface, the first side surface, and one of the end surfaces, a second corner that connects the second main surface, the first side surface, and the end surface, a third corner that connects the first main surface, the second side surface, and the end surface, a fourth corner that connects the second main surface, the second side surface, and the end surface, and a plurality of internal electrodes laminated in a direction of the first axis or a direction of the third axis. The ceramic body has a substantially rectangular parallelepiped shape.

The pair of external electrodes each include a base layer and a first conductive resin layer.

The base layer covers the end surface.

The first conductive resin layer includes a first side surface resin portion disposed on the first side surface to cover the first corner and extending from the first corner to the direction of the first axis and a direction of the second axis, and covers at least a part of the base layer.

As described above, according to the present disclosure, it is possible to provide a multi-layer ceramic electronic component and a circuit board that are capable of suppressing generation of cracks in a ceramic body resulting from solder.

These and other objects, features and advantages of the present disclosure will become more apparent in light of the following detailed description of embodiments thereof, as illustrated in the accompanying drawings.

It is to be understood that both the foregoing general description and the following detailed description are exemplary and explanatory, and are intended to provide further explanation of the disclosure as claimed.

DETAILED DESCRIPTION OF THE EMBODIMENTS

Hereinafter, embodiments of the present disclosure will be described with reference to the drawings.

In the figures, the X-axis, the Y-axis, and the Z-axis orthogonal to one another are shown as appropriate. The X-axis, the Y-axis, and the Z-axis are common in all figures.

I First Embodiment

1. Basic Configuration of Multi-Layer Ceramic Capacitor 10

Figure 1:
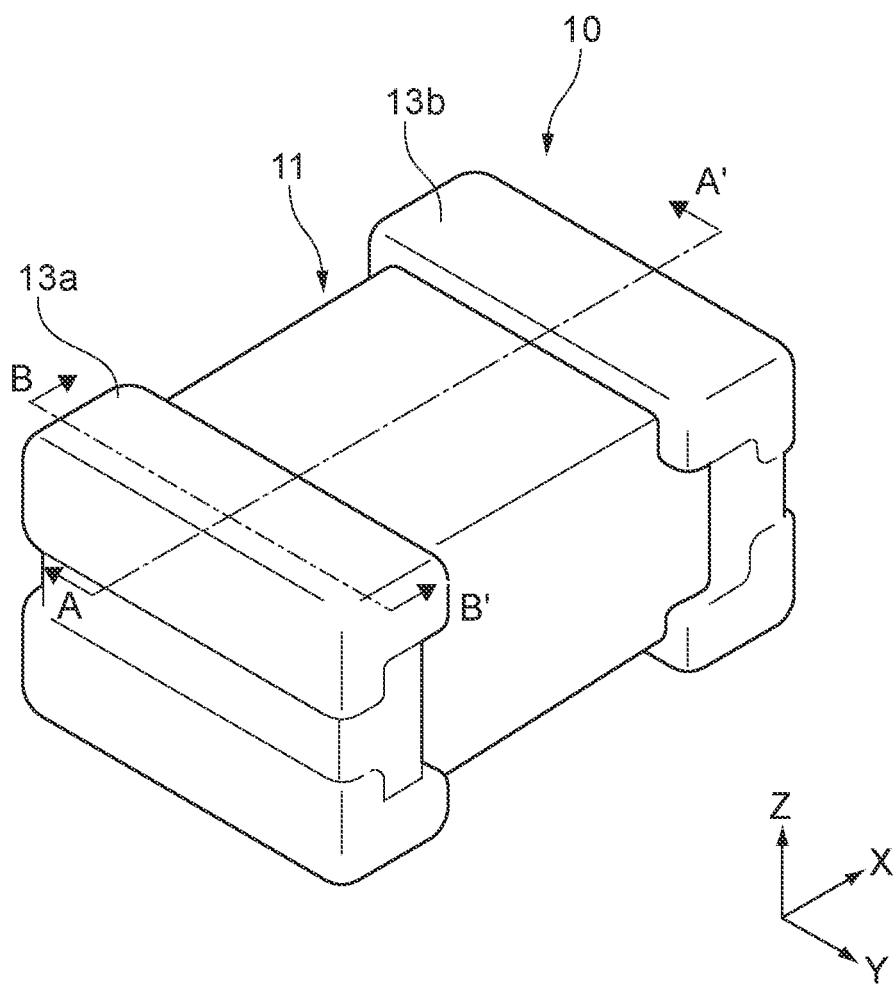
FIG. 1 is a perspective view of a multi-layer ceramic capacitor according to a first embodiment of the present disclosure.
Figure 2:
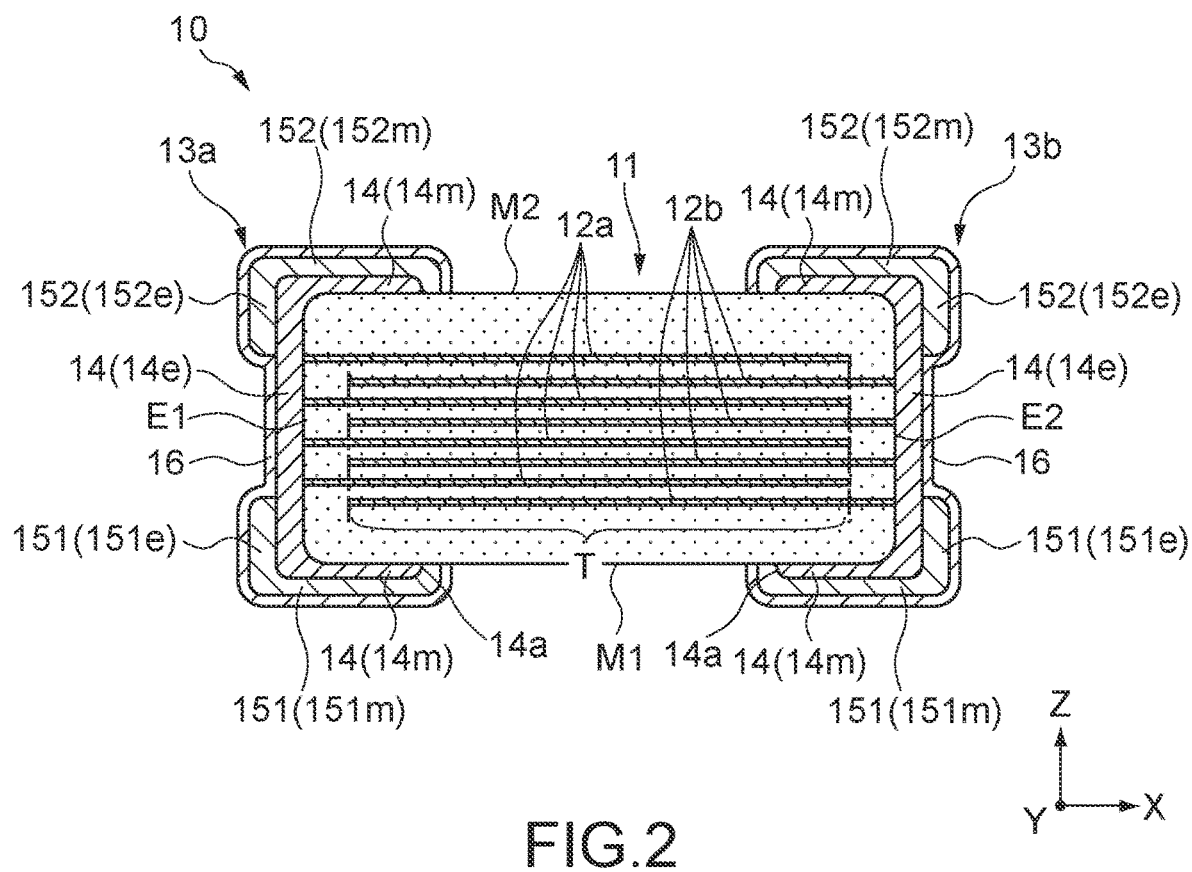
FIG. 2 is a cross-sectional view of the multi-layer ceramic capacitor taken along the line A-A' of FIG. 1.
Figure 3:
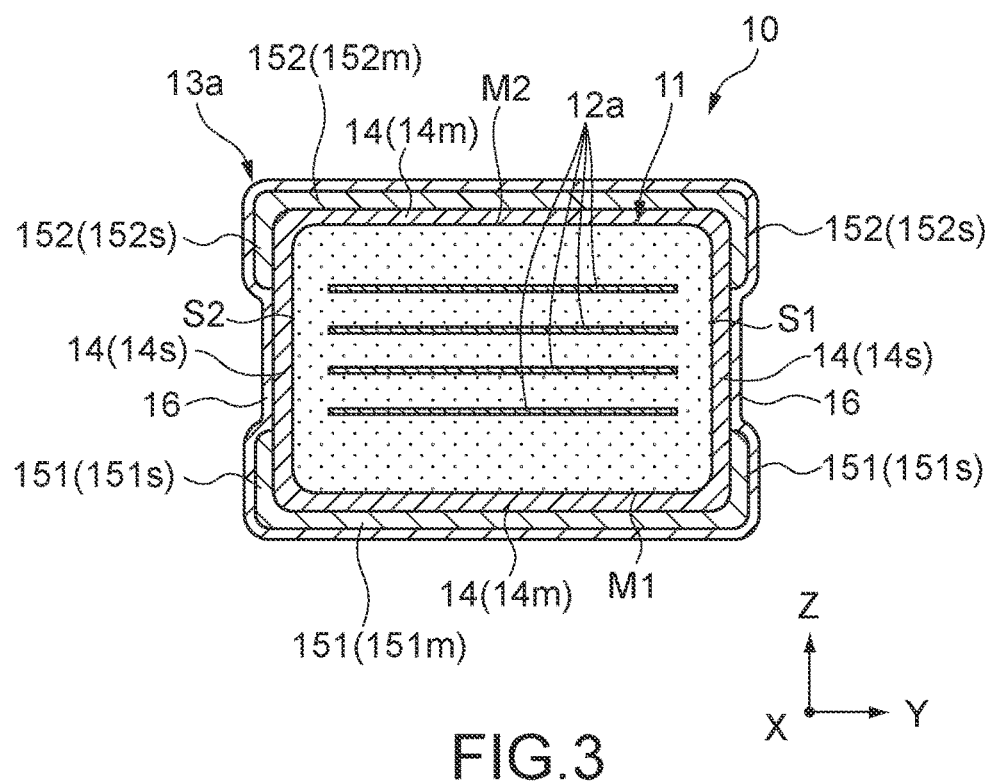
FIG. 3 is a cross-sectional view of the multi-layer ceramic capacitor taken along the line B-B' of FIG. 1.

FIGS. 1 to 3 each show a multi-layer ceramic capacitor 10 according to a first embodiment of the present disclosure. FIG. 1 is a perspective view of the multi-layer ceramic capacitor 10. FIG. 2 is a cross-sectional view of the multi-layer ceramic capacitor 10 taken along the line A-A' of FIG. 1. FIG. 3 is a cross-sectional view of the multi-layer ceramic capacitor 10 taken along the line B-B' of FIG. 1.

The multi-layer ceramic capacitor 10 includes a ceramic body 11, a first external electrode 13a, and a second external electrode 13b. The outer surface of the ceramic body 11 includes first and second end surfaces E1 and E2 perpendicular to the X-axis, first and second side surfaces S1 and S2 perpendicular to the Y-axis, and first and second main surfaces M1 and M2 perpendicular to the Z-axis.

Figure 4:
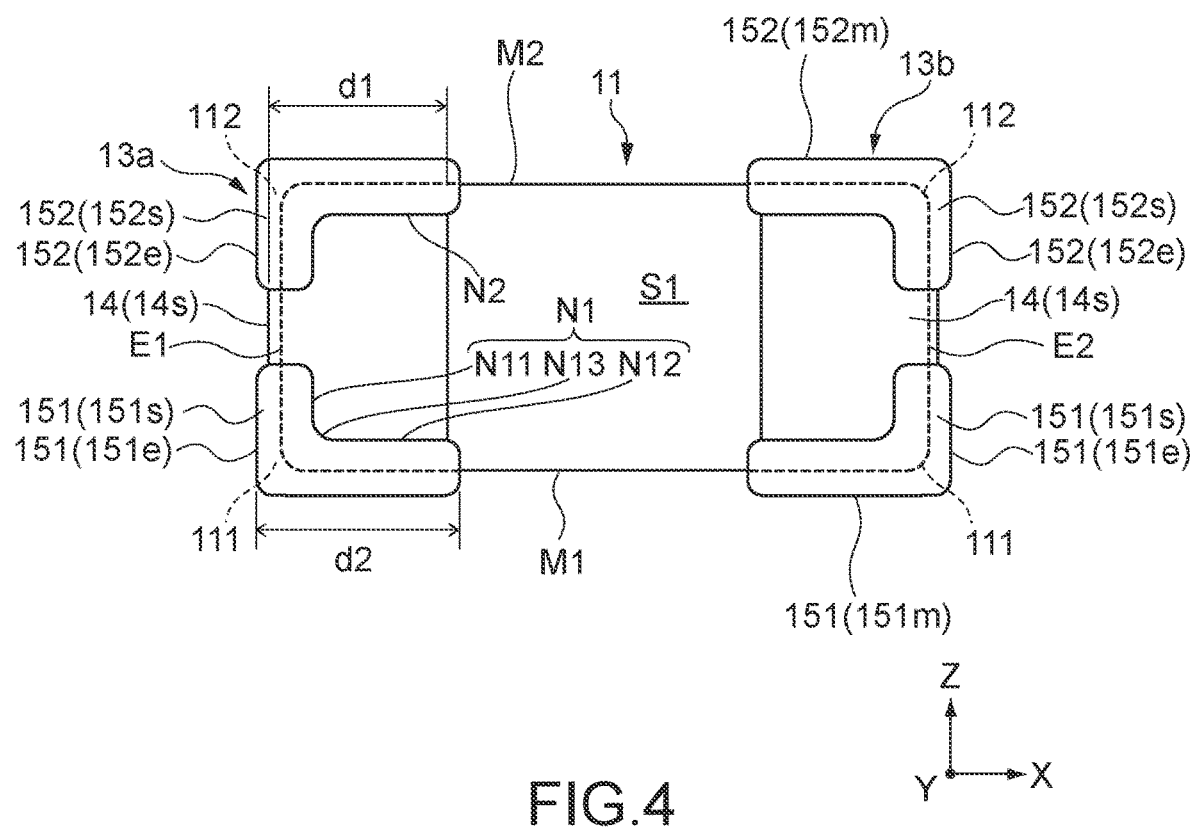
FIG. 4 is a side view of the multi-layer ceramic capacitor as viewed from a third axis direction, in which a plating layer is removed from the external electrode.
Figure 5:
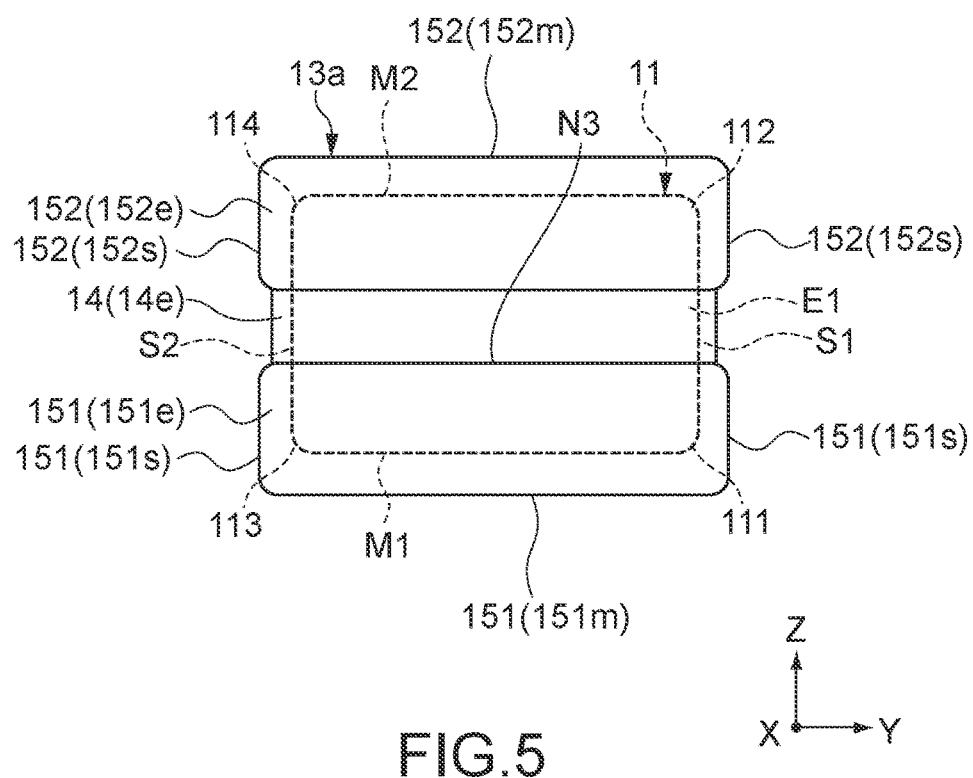
FIG. 5 is a side view of the multi-layer ceramic capacitor as viewed from a second axis direction, in which a plating layer is removed from the external electrode.

The ceramic body 11 has a substantially rectangular parallelepiped shape and includes eight corners. As shown in FIGS. 4, 5, and the like to be described later, a corner that connects the first main surface M1, the first side surface S1, and the first or second end surface E1 or E2 is referred to as a first corner 111. A corner that connects the second main surface M2, the first side surface S1, and the first or second end surface E1 or E2 is referred to as a second corner 112. A corner that connects the first main surface M1, the second side surface S2, and the first or second end surface E1 or E2 is referred to as a third corner 113. A corner that connects the second main surface M2, the second side surface S2, and the first or second end surface E1 or E2 is referred to as a fourth corner 114. It is favorable that the ceramic body 11 is chamfered and the corners 111 to 114 are round to form curves.

In the multi-layer ceramic capacitor 10, the first external electrode 13a covers the first end surface E1 of the ceramic body 11, and the second external electrode 13b covers the second end surface E2 of the ceramic body 11. The first and second external electrodes 13a and 13b face each other in the X-axis direction with the ceramic body 11 interposed therebetween and function as the terminals of the multi-layer ceramic capacitor 10.

The first and second external electrodes 13a and 13b extend inwardly in the X-axis direction from the first and second end surfaces E1 and E2, respectively, along the first and second main surfaces M1 and M2 and the first and second side surfaces S1 and S2 of the ceramic body 11. The first external electrode 13a covers the four corners 111 to 114 located adjacent to the first end surface E1 of the ceramic body 11. The second external electrode 13b covers the four corners 111 to 114 located adjacent to the second end surface E2 of the ceramic body 11.

Note that in this embodiment the multi-layer ceramic capacitor 10 is configured to be substantially symmetric with respect to the Y-Z plane that bisects the multi-layer ceramic capacitor 10 in the X-axis direction. Similarly, the multi-layer ceramic capacitor 10 is configured to be substantially symmetric with respect to the X-Y plane that bisects the multi-layer ceramic capacitor 10 in the Z-axis direction and with respect to the X-Z plane that bisects the multi-layer ceramic capacitor 10 in the Y-axis direction. Such symmetry will be hereinafter described as "symmetry of the multi-layer ceramic capacitor 10".

The first and second external electrodes 13a and 13b are formed of a material having high conductivity. Specifically, the first and second external electrodes 13a and 13b can be formed of a metal mainly containing at least one of nickel (Ni), copper (Cu), palladium (Pd), silver (Ag), or tin (Sn), or an alloy of those metals, for example. The detailed configuration of the first and second external electrodes 13a and 13b will be described later.

The ceramic body 11 is formed of dielectric ceramics. The ceramic body 11 includes a plurality of first internal electrodes 12a and a plurality of second internal electrodes 12b that are covered with dielectric ceramics. The first and second internal electrodes 12a and 12b each have a sheet-like shape extending along the X-Y plane, and in the example shown in FIGS. 2 and 3, are alternately disposed along the Z-axis direction.

The ceramic body 11 includes an opposing region T in which the first and second internal electrodes 12a and 12b are opposed to each other in the Z-axis direction with ceramic layers interposed therebetween. The first internal electrodes 12a are drawn to the first end surface E1 from the opposing region T and connected to the first external electrode 13a. The second internal electrodes 12b are drawn to the second end surface E2 from the opposing region T and connected to the second external electrode 13b.

With the configuration described above, when a voltage is applied between the first external electrode 13a and the second external electrode 13b in the multi-layer ceramic capacitor 10, the voltage is applied to the ceramic layers in the opposing region T including the first and second internal electrodes 12a and 12b. Thus, the multi-layer ceramic capacitor 10 stores charge corresponding to the voltage applied between the first and second external electrodes 13a and 13b.

In the ceramic body 11, in order to increase a capacitance of each ceramic layer provided between the first and second internal electrodes 12a and 12b, dielectric ceramics having a high dielectric constant is used. The dielectric ceramics can mainly contain, for example, a ceramic material having a perovskite structure represented by general formula $ABO_3$. Note that the perovskite structure may contain $ABO_{3-\alpha}$ outside the stoichiometry. Examples of the ceramic material having a perovskite structure include a material containing barium (Ba) and titanium (Ti), typified by barium titanate ($BaTiO_3$). Specifically, for example, $Ba_{1-x-y}Ca_xSr_yTi_{1-z}Zr_zO_3$ ($0 \leq x \leq 1$, $0 \leq y \leq 1$, $0 \leq z \leq 1$) is included.

Note that the dielectric ceramics may have a composition system of strontium titanate ($SrTiO_3$), calcium titanate ($CaTiO_3$), magnesium titanate ($MgTiO_3$), calcium zirconate ($CaZrO_3$), calcium zirconate titanate ($Ca(Zr,Ti)O_3$), barium zirconate ($BaZrO_3$), titanium oxide ($TiO_2$), or the like.

2. Detailed Configuration of External Electrodes 13a and 13b

In the multi-layer ceramic capacitor 10, each of the first and second external electrodes 13a and 13b includes a base layer 14 and a first conductive resin layer 151. Further, in this embodiment, each of the first and second external electrodes 13a and 13b includes a second conductive resin layer 152 and a plating layer 16. Note that the first external electrode 13a on the first end surface E1 will be described below, but the second external electrode 13b on the second end surface E2 is also configured similarly on the basis of the symmetry of the multi-layer ceramic capacitor 10.

The base layer 14 covers the first end surface E1. In this embodiment, the base layer 14 extends from the first end surface E1 in the X-axis direction along the first and second main surfaces M1 and M2 and the first and second side surfaces S1 and S2. In other words, the base layer 14 includes an end surface base portion 14e disposed on the first end surface E1, a pair of side surface base portions 14s disposed on the first and second side surfaces S1 and S2, and a pair of main surface base portions 14m disposed on the first and second main surfaces M1 and M2. The end surface base portion 14e, the pair of side surface base portions 14s, and the pair of main surface base portions 14m are formed to be continuous.

In this embodiment, the base layer 14 is configured as a sintered metal film obtained by baking a conductive metal paste. By way of example, the main component of the base layer can be any one of Ni, Cu, Pd, and Ag.

The first and second conductive resin layers 151 and 152 cover at least a part of the base layer 14. In this embodiment, the first conductive resin layer 151 covers the main surface base portion 14m of the base layer 14 on the first main surface M1, and extends upwardly in the Z-axis direction along the pair of side surface base portions 14s and the end surface base portion 14e. Similarly, the second conductive resin layer 152 covers the main surface base portion 14m of the base layer 14 on the second main surface M2, and extends downwardly in the Z-axis direction along the pair of side surface base portions 14s and the end surface base portion 14e. The second conductive resin layer 152 is apart from the first conductive resin layer 151 in the Z-axis direction.

Specifically, the first conductive resin layer 151 includes a first main surface resin portion 151m that covers the first main surface M1, a pair of first side surface resin portions 151s that cover the first and second side surfaces S1 and S2, and a first end surface resin portion 151e that covers the first end surface E1. The first main surface resin portion 151m, the pair of first side surface resin portions 151s, and the first end surface resin portion 151e are formed to be continuous.

Similarly, the second conductive resin layer 152 includes a second main surface resin portion 152m that covers the second main surface M2, a pair of second side surface resin portions 152s that cover the first and second side surfaces S1 and S2, and a second end surface resin portion 152e that covers the first end surface E1. The second main surface resin portion 152m, the pair of second side surface resin portions 152s, and the second end surface resin portion 152e are formed to be continuous.

The first and second conductive resin layers 151 and 152 include, for example, a resin and a conductive material. Examples of the resin include a thermosetting resin. Examples of the thermosetting resin include a phenol resin, an acrylic resin, a silicone resin, an epoxy resin, and a polyimide resin. Examples of the conductive material include metal powder (conductive filler) including particles with a spherical shape or flattened shape. Examples of the metal powder include Ag powder and Cu powder. In addition to the above components, the first and second conductive resin layers 151 and 152 may contain other components such as organic solvents and curing agents.

The plating layer 16 covers the base layer 14 and the first and second conductive resin layers 151 and 152. The plating layer 16 is, for example, a film formed on the base layer 14 and the first and second conductive resin layers 151 and 152 by a wet plating method. The plating layer 16 can be formed in a single-layer or multi-layer structure mainly containing any one of Ni, Cu, Sn, Pd, and Ag.

FIGS. 4 and 5 are side views of the multi-layer ceramic capacitor 10, in which the plating layers 16 are removed from the first and second external electrodes 13a and 13b. FIG. 4 is a view seen from the Y-axis direction. FIG. 5 is a view seen from the X-axis direction. Note that those figures show the respective configurations of the multi-layer ceramic capacitor 10 as viewed from the first side surface S1 and the first end surface E1, but the configurations as viewed from the second side surface S2 and the second end surface E2 are the same on the basis of the symmetry of the multi-layer ceramic capacitor 10.

As shown in those figures, each of the first and second external electrodes 13a and 13b includes the first and second conductive resin layers 151 and 152 each having a characteristic shape from the viewpoint of suppressing the concentration of stress due to solder at the time of mounting.

As shown in FIG. 4, the first side surface resin portion 151s of the first conductive resin layer 151 is disposed on the first side surface S1 to cover the first corner 111, and has a planar shape extending from the first corner 111 in the Z-axis direction and the X-axis direction. In other words, the first side surface resin portion 151s has an L-shaped planar shape as viewed from the Y-axis direction. Further, the first side surface resin portion 151s has an L-shaped inner edge N1 along the first corner 111. The inner edge N1 overlaps with the first side surface S1 in a planar view from the Y-axis direction. The inner edge N1 includes, for example, a first extending portion N11 extending in the Z-axis direction, a second extending portion N12 extending in the X-axis direction, and a curvature N13 with a curved shape that connects the first extending portion N11 and the second extending portion N12. The curvature N13 is curved convexly toward the first corner 111.

Similarly, the second side surface resin portion 152s of the second conductive resin layer 152 is disposed on the first side surface S1 to cover the second corner 112, and has a planar shape extending from the second corner 112 in the Z-axis direction and the X-axis direction. In other words, the second side surface resin portion 152s has an L-shaped planar shape as viewed from the Y-axis direction, for example. Further, the second side surface resin portion 152s has an L-shaped inner edge N2 along the second corner 112. The inner edge N2 overlaps with the first side surface S1 in a planar view from the Y-axis direction. The second side surface resin portion 152s is apart from the first side surface resin portion 151s in the Z-axis direction.

The "L-shaped" planar shape of each of the first and second side surface resin portions 151s and 152s may be the shape along the L-shaped contour of each of the first and second corners 111 and 112. The "L-shaped" planar shape is assumed to be L-shaped even if it is seen different from the shape of the letter "L" in a precise sense. Further, the shape of "L" also includes rotationally symmetric shapes.

As shown in FIG. 5, the first end surface resin portion 151e of the first conductive resin layer 151 connects the pair of first side surface resin portions 151s. The first end surface resin portion 151e includes an inner edge N3 located adjacent to the center in the Z-axis direction, and the inner edge N3 is connected to the inner edges N1 of the first side surface resin portions 151s. In the example shown in FIG. 5, the inner edge N3 is configured to be substantially liner along the Y-axis direction. However, the shape of the inner edge N3 is not limited to this and may be convexly curved in the Z-axis direction, for example.

Similarly, the second end surface resin portion 152e of the second conductive resin layer 152 connects the pair of second side surface resin portions 152s. The second end surface resin portion 152e is apart from the first end surface resin portion 151e in the Z-axis direction.

Note that the plating layer 16 is formed to cover the base layer 14 and the first and second conductive resin layers 151 and 152. Thus, the contour of the plating layer 16 is formed along the contour combining the base layer 14 and the first and second conductive resin layers 151 and 152. Further, the plating layer 16 is formed to have a uniform thickness and has unevenness corresponding to the surface unevenness of the base layer 14 and the first and second conductive resin layers 151 and 152. In other words, in the plating layer 16, the portions of the first and second conductive resin layers 151 and 152 protrude from the portion of the base layer 14. This configuration provides the surface of the plating layer 16 with L-shaped steps Ds resulting from the shapes of the inner edges N1 and N2 of the respective first and second side surface resin portions 151s and 152s and with steps De resulting from the shapes of the inner edges N3 of the respective first and second end surface resin portions 151e and 152e (see FIGS. 6A, 6B, and 7).

Figure 6A:
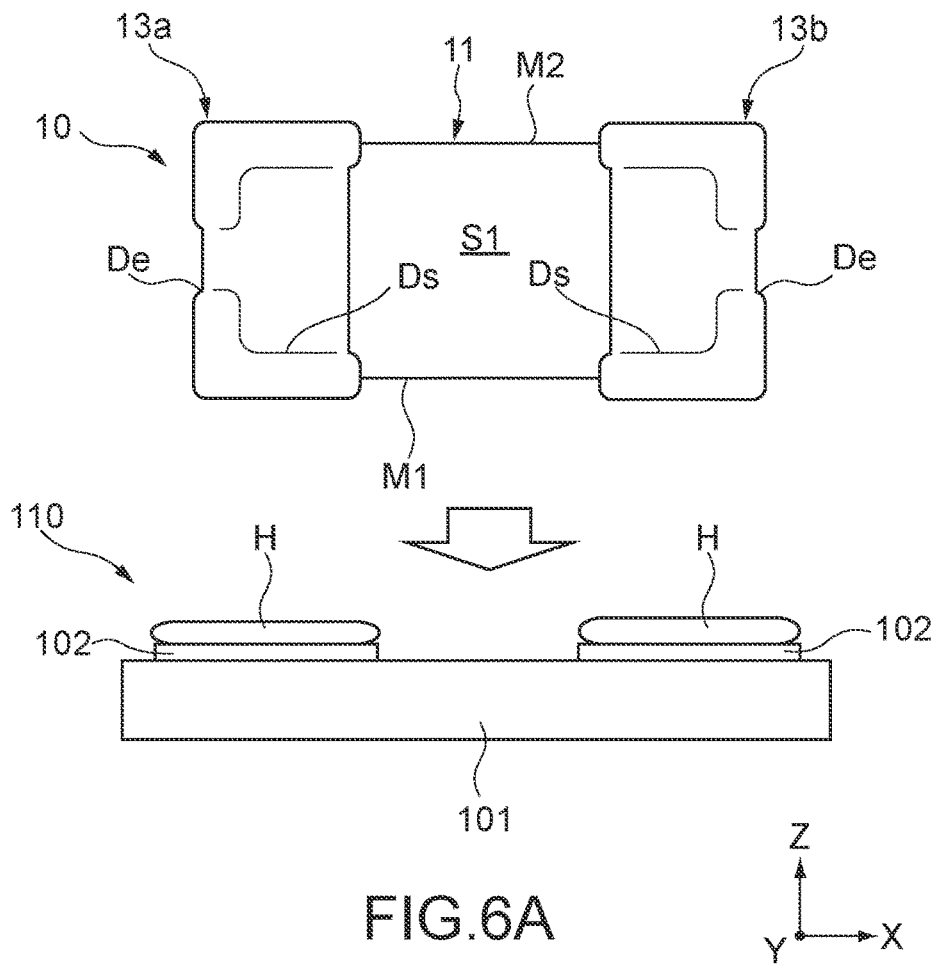
FIG. 6A is a side view showing the mounting process of the multi-layer ceramic capacitor.

FIG. 6A is a side view showing the production process of a circuit board 100 including the multi-layer ceramic capacitor 10. The circuit board 100 includes a mounting substrate 110 on which the multi-layer ceramic capacitor 10 is to be mounted via solder H. The mounting substrate 110 includes a base material 101 extending along the X-Y plane, and connection electrodes 102 provided on the base material 101. The two connection electrodes 102 are disposed corresponding to the first and second external electrodes 13a and 13b of the multi-layer ceramic capacitor 10.

In the production process of the circuit board 100, first, the solder H is disposed on each of the connection electrodes 102 of the mounting substrate 110. The multi-layer ceramic capacitor 10 is disposed on the mounting substrate 110 in a state where the first main surface M1 of the ceramic body 11 faces the mounting substrate 110 and the positions of the first and second external electrodes 13a and 13b are aligned with the positions of the connection electrodes 102.

The mounting substrate 110 on which the multi-layer ceramic capacitor 10 is disposed is heated in a reflow furnace or the like, to melt the solder H on the connection electrodes 102. Thus, the solder H in the molten state wets and spreads along the surfaces of the connection electrodes 102 of the mounting substrate 110 and the first and second external electrodes 13a and 13b of the multi-layer ceramic capacitor 10.

Figure 6B:
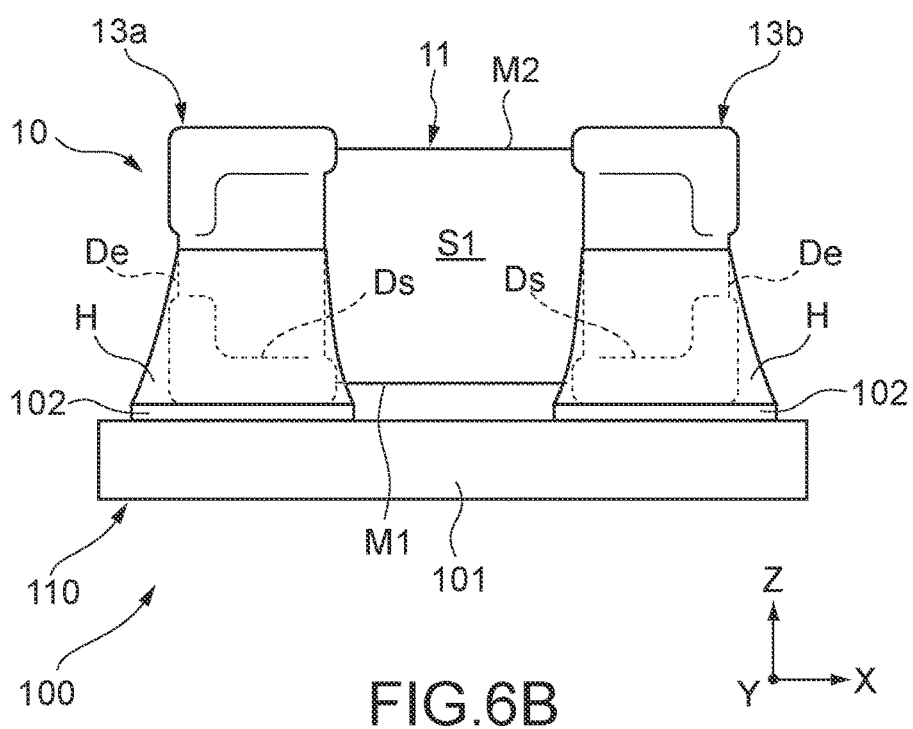
FIG. 6B is a side view of a circuit board on which the multi-layer ceramic capacitor is mounted.

Specifically, the solder H wets and spreads between the connection electrode 102 and each of the first and second external electrodes 13a and 13b and further wets and spreads upwardly in the Z-axis direction on the first and second external electrodes 13a and 13b. Subsequently, the temperature of the solder H is returned to room temperature and then solidified, thus obtaining the circuit board 100 in which the multi-layer ceramic capacitor 10 is connected to the mounting substrate 110 via the solder H, as shown in FIG. 6B.

When the solder H is solidified, the solder H contracts and thus may cause stress in the ceramic body 11 via the first and second external electrodes 13a and 13b. If the solder H is unevenly distributed, the stress concentrates on that portion and may cause cracks in the ceramic body 11.

Meanwhile, it is also assumed that the multi-layer ceramic capacitor 10 including the first and second external electrodes 13a and 13b including the first and second conductive resin layers 151 and 152 is used under severe environments where the mounting substrate 110 is repeatedly deflected and deformed depending on a temperature change. In this case, if a large stress is caused by the solder H in addition to the deflection and deformation of the mounting substrate 110, the first and second conductive resin layers 151 and 152 having a high deformability fail to absorb the stress and are likely to have cracks in the ceramic body 11. Hence, there is a demand for a multi-layer ceramic capacitor 10 having a configuration capable of more reliably suppressing the concentration of the stress due to the solder H.

Figure 7A:
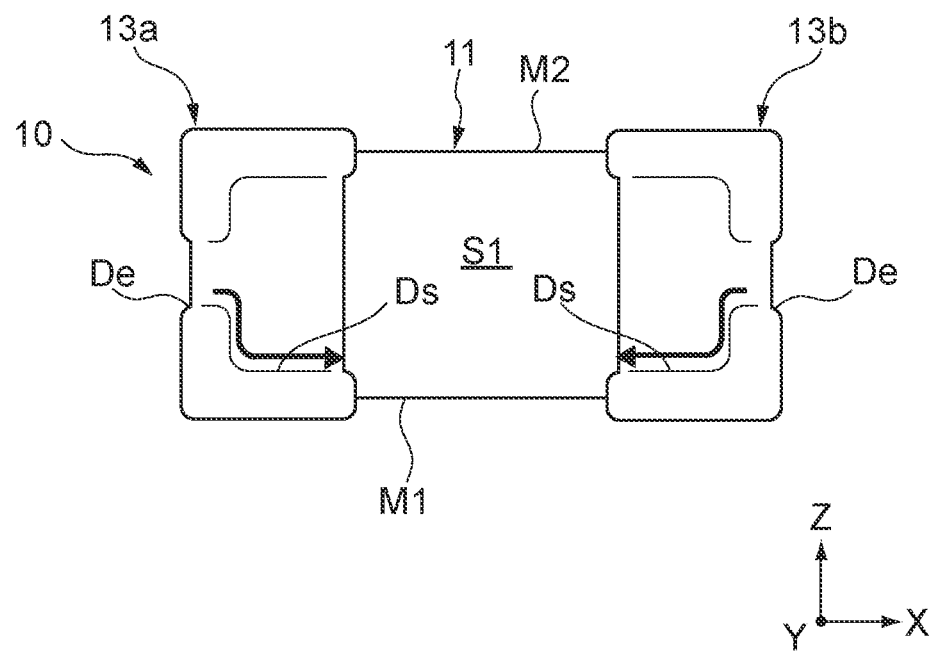
FIG. 7A is a side view of the multi-layer ceramic capacitor as viewed from the third axis direction.

In view of such a demand, this embodiment provides the first conductive resin layer 151 including the first side surface resin portions 151s each having an L-shaped planar shape. With this configuration, the L-shaped step Ds is formed on each surface of the first and second external electrodes 13a and 13b as shown in FIG. 7A.

First, the molten solder H is likely to wet and spread upwardly in the Z-axis direction on portions adjacent to the first and second end surfaces E1 and E2 of the first and second external electrodes 13a and 13b each having a large electrode area, and then wet and spread from the portions adjacent to the first and second end surfaces E1 and E2 of the first and second external electrodes 13a and 13b toward the first and second side surfaces S1 and S2. In this embodiment, the solder H reaching the first and second side surfaces S1 and S2 is likely to wet and spread from the first and second end surfaces E1 and E2 toward the center in the X-axis direction along the L-shaped steps Ds as shown by the arrows of FIG. 7A. In other words, the solder H wets and spreads in the wide range of the first and second side surfaces S1 and S2 without accumulating on the portions adjacent to the first and second end surfaces E1 and E2 of the first and second external electrodes 13a and 13b.

Further, the inner edge N1 of the first side surface resin portion 151s is formed to be L-shaped, so that the length of the step Ds, which may be a guide portion for the solder H, can be satisfactorily ensured. In addition, the inner edge N1 includes the first extending portion N11 extending in the Z-axis direction, and thus the solder H reaching each of the first and second side surfaces S1 and S2 may be guided downwardly in the Z-axis direction through the first extending portion N11. This configuration hinders the solder H from easily returning to the first and second end surfaces E1 and E2 and allows the solder H to be easily guided toward the center in the X-axis direction. In addition, in this embodiment, the curvature N13 of the inner edge N1 is round and is not square-shaped. This prevents the solder H from accumulating at the square-shaped portion. Those configurations make it possible to smoothly and reliably guide the molten solder H toward the center in the X-axis direction.

Therefore, the above-mentioned configurations make it possible to distribute the solder H in the wide range to the vicinity of the end portion of the first conductive resin layer 151 at the center in the X-axis direction without accumulating at a certain portion even if the amount of the solder H is large. When the solder H is solidified, the stress resulting from the solder H is distributed, which suppresses generation of cracks in the ceramic body 11. As a result, the ceramic body 11 can maintain a satisfactory deflection strength and also maintain the reliability of moisture resistance.

Figure 7B:
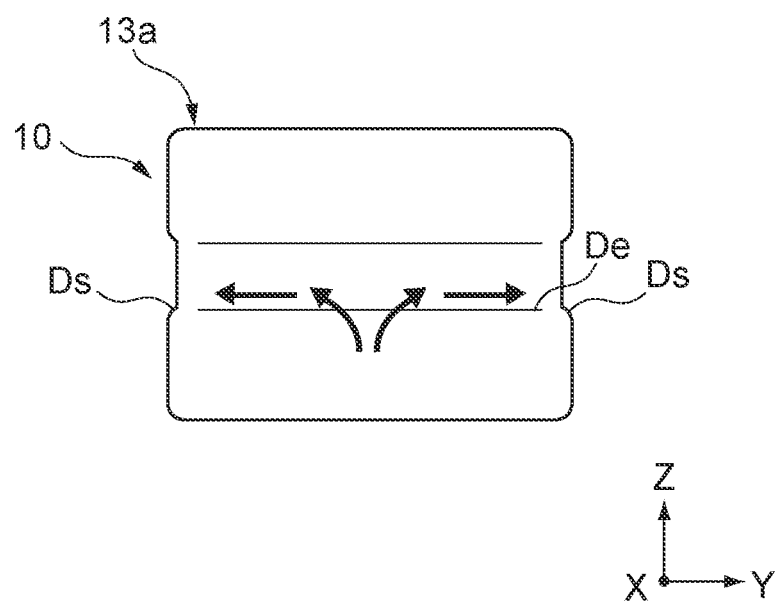
FIG. 7B is a side view of the multi-layer ceramic capacitor as viewed from the second axis direction.

Further, in this embodiment, the first conductive resin layer 151 includes the first end surface resin portion 151e, which is formed to be continuous from the first side surface resin portions 151s. The inner edge N3 of the first end surface resin portion 151e and the base layer 14 form a step therebetween. In other words, due to such a step, a step De that may be a guide portion for the solder H is also formed on each of portions adjacent to the first and second end surfaces E1 and E2 of the first and second external electrodes 13a and 13b, as shown in FIG. 7B. The step De is connected to the steps Ds on the first and second side surfaces S1 and S2.

Thus, the solder H, which wets and spreads upwardly in the Z-axis direction on the portions adjacent to the first and second end surfaces E1 and E2 of the first and second external electrodes 13a and 13b, is likely to wet and spread in the Y-axis direction to both end portions in the Y-axis direction along the step De, as shown by the arrows of FIG. 7B. In addition, the solder H reaching both end portions of the step De in the Y-axis direction can be continuously transmitted along the steps Ds to wet and spread on the portions adjacent to the first and second side surfaces S1 and S2 of the first and second external electrodes 13a and 13b. In such a manner, this configuration makes it possible to smoothly guide the solder H from the portions adjacent to the first and second end surfaces E1 and E2 of the first and second external electrodes 13a and 13b to the portions adjacent to the first and second side surfaces S1 and S2 of the first and second external electrodes 13a and 13b, and to prompt the solder H to wet and spread. Therefore, the concentration of the stress resulting from the solder H can be suppressed more effectively.

In addition, providing the first and second conductive resin layers 151 and 152 on the first main surface M1 and the second main surface M2 can provide a form in which the first main surface M1 is caused to face the mounting substrate 110 and a form in which the second main surface M2 is caused to face the mounting substrate 110 at the time of mounting. This makes it possible to enhance the degree of freedom of the posture of the multi-layer ceramic capacitor at the time of mounting and enhance the convenience at the time of mounting.

Further, as shown in FIG. 4, a dimension d1 of the side surface base portion 14s in the X-axis direction may be smaller than a dimension d2 of the first side surface resin portion 151s in the X-axis direction. Thus, the boundary between the end portion 14a of the base layer 14 on the inner side in the X-axis direction (see FIG. 2) and the ceramic body 11 is covered with the first conductive resin layer 151. The end portion 14a is a location where the stress is likely to concentrate when the circuit board 100 is deflected and deformed, for example, and is thus covered with the first side surface resin portion 151s having a relatively high deformability, thus making it possible to mitigate the stress. Therefore, the generation of cracks in the ceramic body 11 can be suppressed more reliably.

3. Production Method for Multi-Layer Ceramic Capacitor 10

Figure 8:
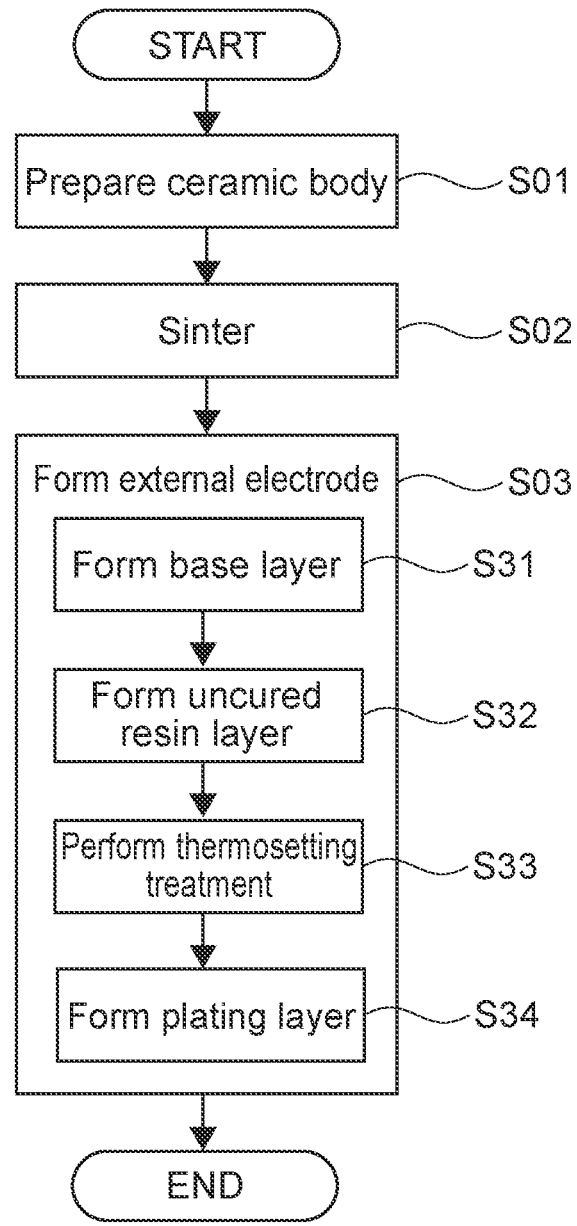
FIG. 8 is a flowchart showing a production method for the multi-layer ceramic capacitor.
Figure 9:
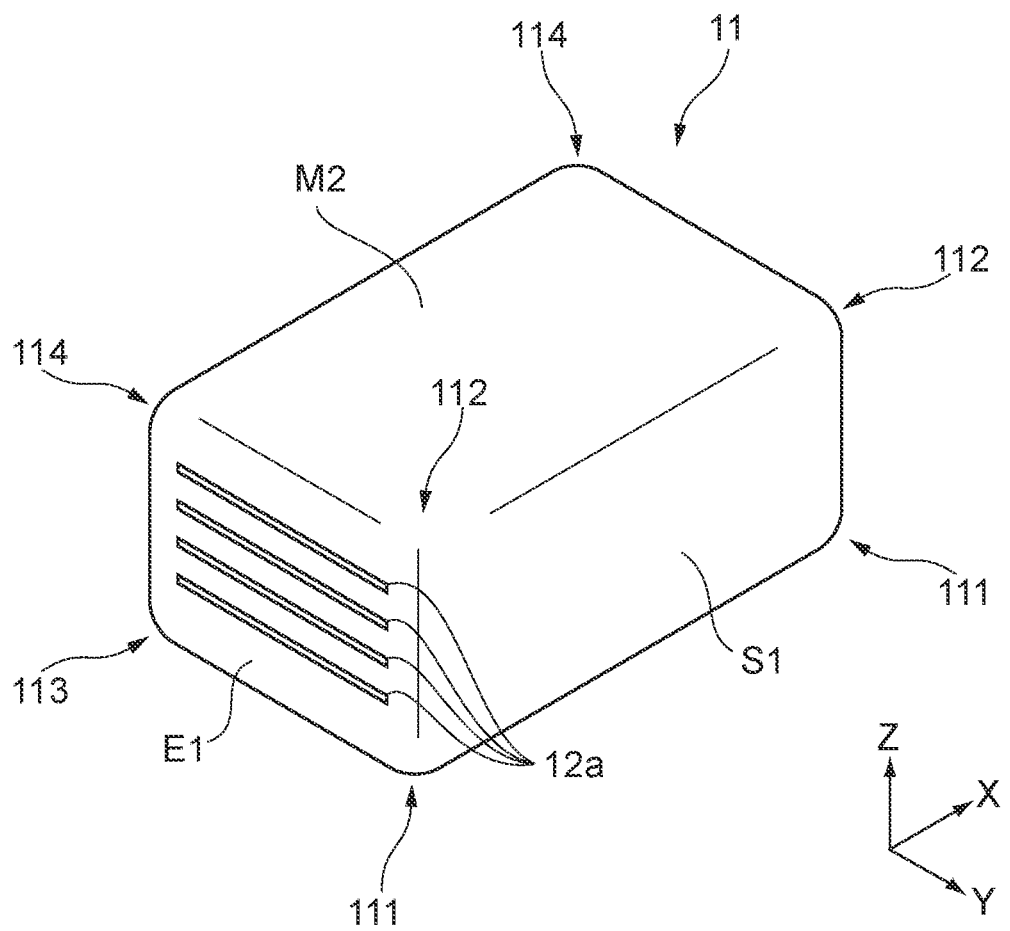
FIG. 9 is a perspective view of a ceramic body obtained in Step S02.

FIG. 8 is a flowchart showing an example of a production method for the multi-layer ceramic capacitor 10 according to this embodiment. FIGS. 9 to 10F are views showing a production process for the multi-layer ceramic capacitor 10. Hereinafter, the production method for the multi-layer ceramic capacitor 10 will be described according to FIG. 8 with reference to FIGS. 9 to 10F as appropriate.

3.1 Step S01: Preparation of Ceramic Body

In Step S01, an unsintered ceramic body 11 is prepared. The unsintered ceramic body 11 is obtained by laminating and thermocompression-bonding a plurality of ceramic sheets in the Z-axis direction. By printing a conductive metal paste of a predetermined pattern on the ceramic sheets in advance, the first and second internal electrodes 12a and 12b can be arranged.

The ceramic sheet is an unsintered dielectric green sheet obtained by forming ceramic slurry into a sheet shape. The ceramic sheet is formed into a sheet shape by using a roll coater or a doctor blade, for example. Components of the ceramic slurry are adjusted so as to obtain a ceramic body 11 with a predetermined composition.

3.2 Step S02: Sintering

In Step S02, the unsintered ceramic body 11 obtained in Step S01 is sintered. As a result, the ceramic body 11 is sintered, and the ceramic body 11 shown in FIG. 9 is obtained. Sintering of the ceramic body 11 can be performed in a reduction atmosphere or a low-oxygen partial pressure atmosphere, for example. The sintering conditions of the ceramic body 11 can be appropriately determined.

3.3 Step S03: Formation of External Electrodes

In Step S03, the first and second external electrodes 13a and 13b are formed on the ceramic body 11 obtained in Step S02. Thus, the multi-layer ceramic capacitor 10 shown in FIGS. 1 to 3 is completed. Step S03 includes four steps of Step S31, Step S32, Step S33, and Step S34.

3.3.1 Step S31: Formation of Base Layer

In Step S31, base layers 14 of the first and second external electrodes 13a and 13b are formed on the ceramic body 11. The base layers 14 are formed by, for example, applying a conductive metal paste onto the first and second end surfaces E1 and E2 and baking them.

The method of applying a conductive metal paste is not particularly limited, but a dip method of immersing the first and second end surfaces E1 and E2 of the ceramic body 11 in the X-axis direction into a conductive metal paste can be used, for example. This method makes it possible to easily form the base layers 14 having the shape going around the first and second main surfaces M1 and M2 and the first and second side surfaces S1 and S2 from the first end surface E1. Further, in this method, the dimension of the base layer 14 (the side surface base portion 14s) in the X-axis direction can be adjusted depending on the depth of the conductive metal paste in the X-axis direction when the ceramic body 11 is immersed into the conductive metal paste.

Further, if the conductive metal paste is applied to the base layers 14 before Step S02, sintering of the ceramic body 11 in Step S02 and baking of the base layers 14 in Step S31 can be performed by one time of heat treatment.

3.3.2 Step S32: Formation of Uncured Resin Layer

In Step S32, uncured resin layers L constituting the first and second conductive resin layers 151 and 152 of the first and second external electrodes 13a and 13b are formed on the ceramic body 11 on which the base layers 14 are formed. The uncured resin layers L are formed using an uncured resin paste P containing a conductive material.

Figure 10A:
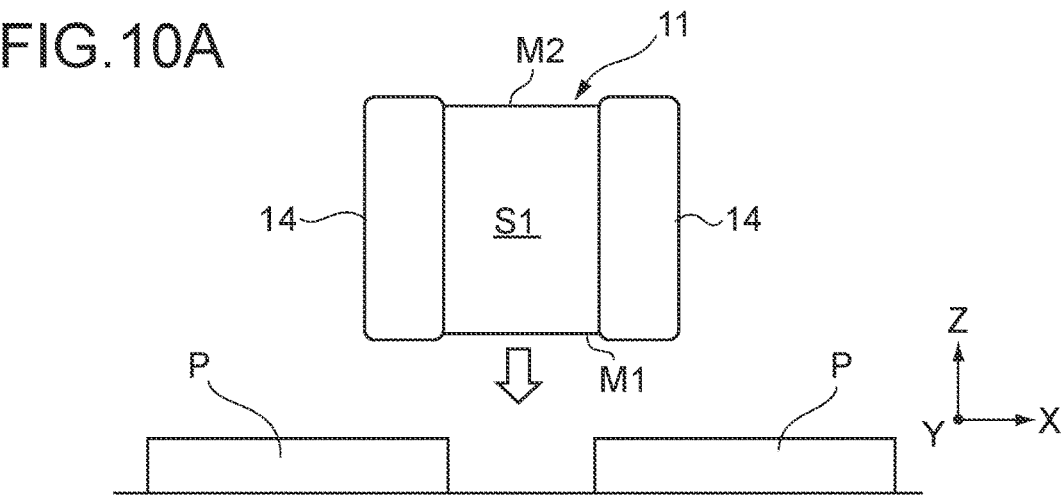
FIG. 10A is a view showing Step S32.
Figure 10B:
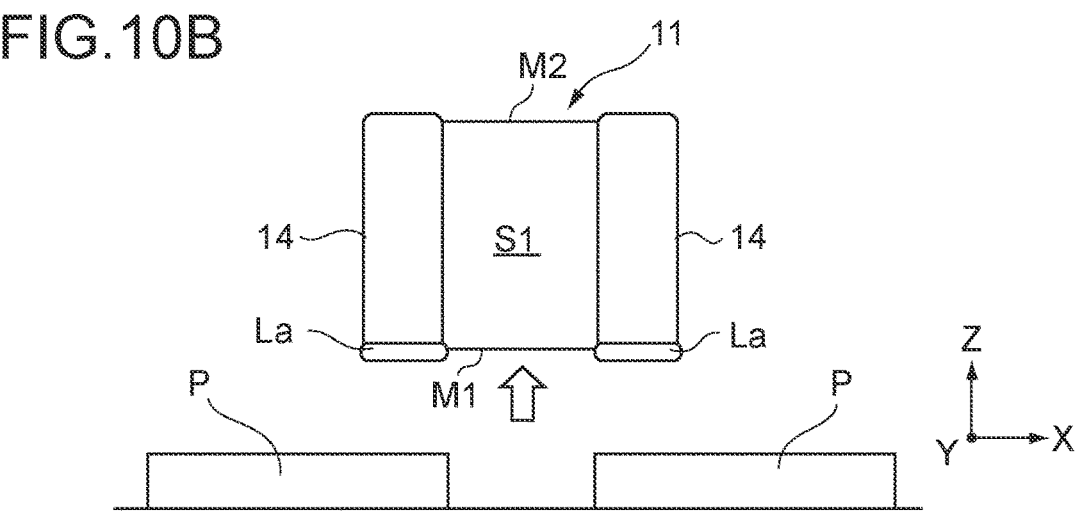
FIG. 10B is a view showing Step S32.
Figure 10C:
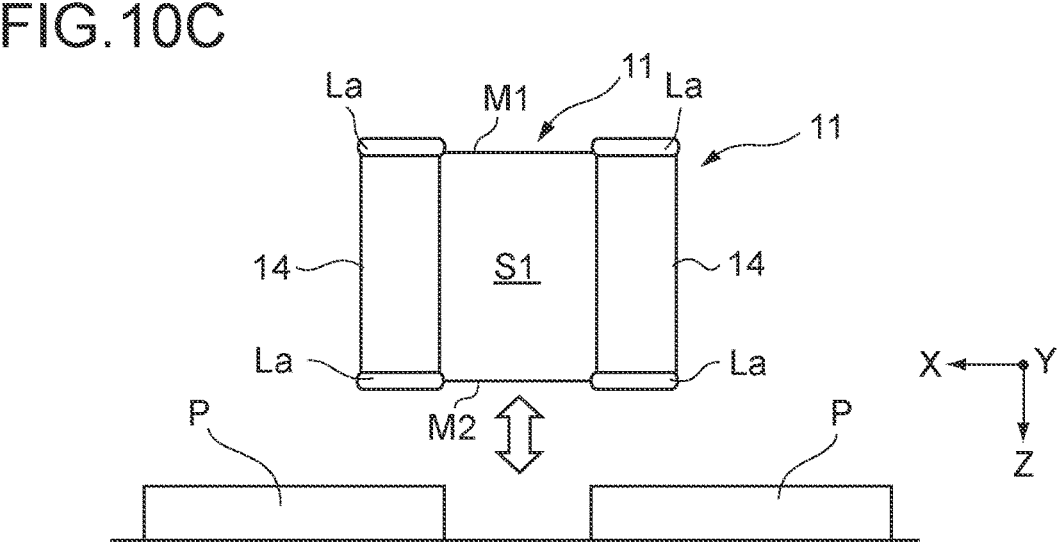
FIG. 10C is a view showing Step S32.
Figure 10D:
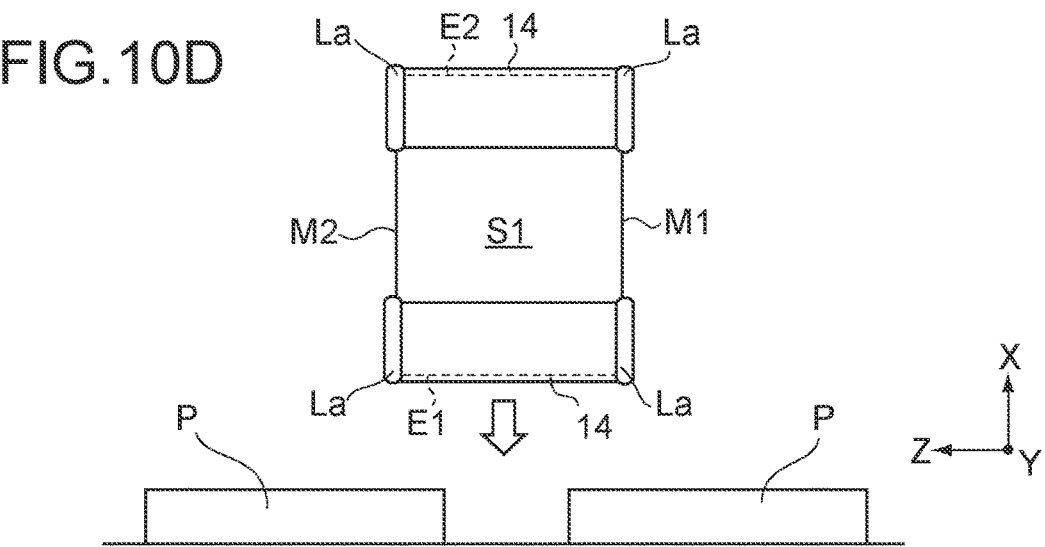
FIG. 10D is a view showing Step S32.
Figure 10E:
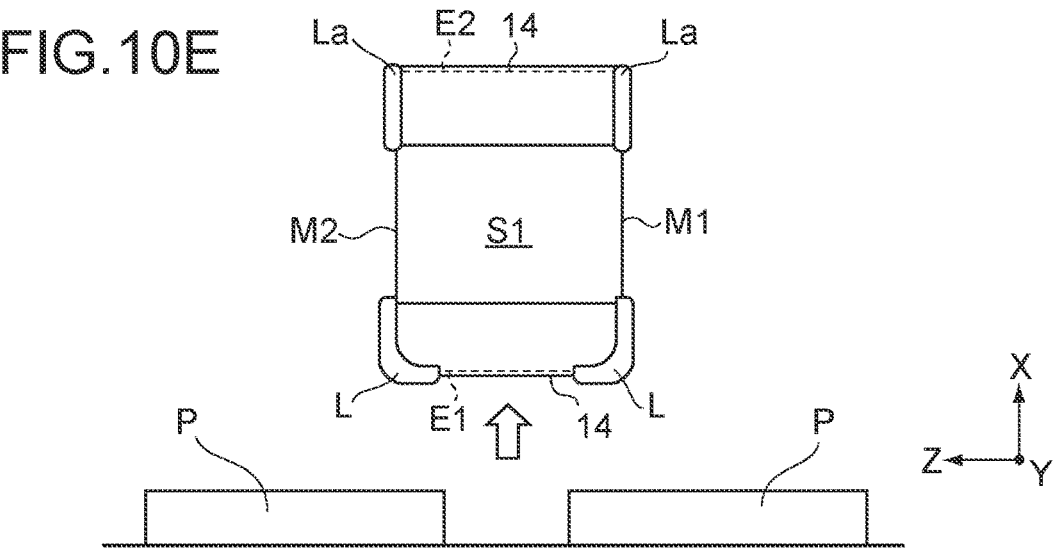
FIG. 10E is a view showing Step S32.
Figure 10F:
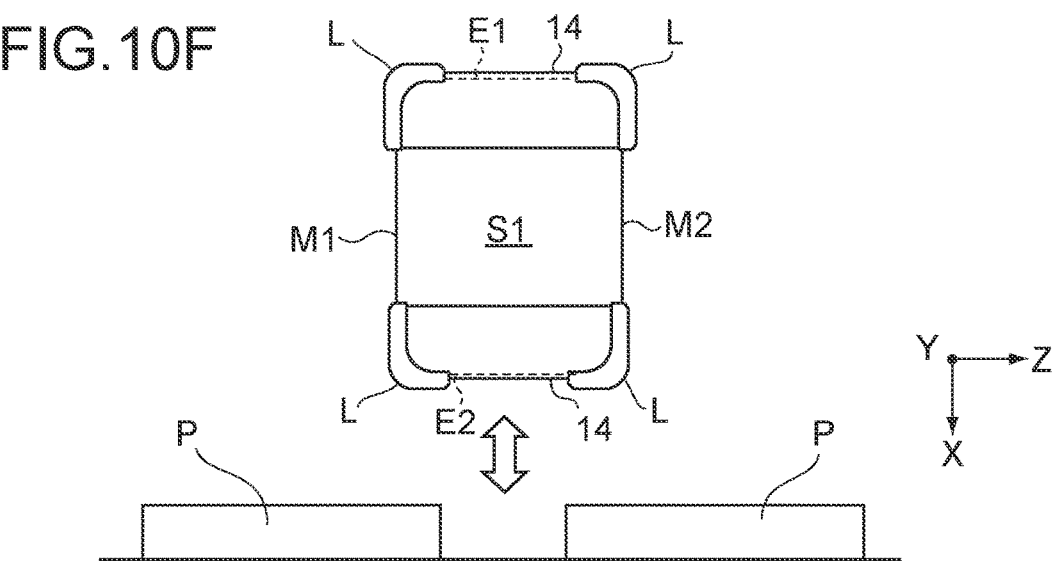
FIG. 10F is a view showing Step S32.

FIGS. 10A to 10F show the process of forming the uncured resin layers L on the ceramic body 11 in Step S32. First, as shown in FIG. 10A, the first main surface M1 of the ceramic body 11 is immersed into the uncured resin paste P, which is disposed at two locations spaced apart from each other. As a result, the uncured resin paste P adheres to the first main surface M1 of the ceramic body 11, and thus intermediate films La serving as part of the uncured resin layers L are formed as shown in FIG. 10B.

At this time, the length of the uncured resin paste P in the Y-axis direction is made larger than the length of the first main surface M1 in the Y-axis direction, so that each of the intermediate films La can be formed to be continuous from the portion adjacent to the first side surface S1 to the portion adjacent to the second side surface S2 of the first main surface M1.

Similarly, as shown in FIG. 10C, the second main surface M2 of the ceramic body 11 is immersed into the uncured resin paste P, and thus intermediate films La serving as part of the second uncured resin layers L2a are also formed on the second main surface M2 of the ceramic body 11. Thus, the intermediate films La are formed at four positions on the surfaces of the ceramic body 11.

Next, as shown in FIG. 10D, a part of the base layer 14 on the first end surface E1 is immersed into the uncured resin paste P, which is disposed at two locations spaced apart from each other. As a result, the uncured resin paste P adheres to the portion of the base layer 14 on the first end surface E1 and is integrated with the uncured resin paste P constituting the intermediate films La, so that L-shaped uncured resin layers L are formed as shown in FIG. 10E.

At this time as well, the length of the uncured resin paste P in the Y-axis direction is made larger than the length of the first end surface E1 in the Y-axis direction, so that the uncured resin layer L can be formed to be continuous from the portion adjacent to the first side surface S1 to the portion adjacent to the second side surface S2 of the first end surface E1.

Similarly, as shown in FIG. 10F, the second end surface E2 of the ceramic body 11 is immersed into the uncured resin paste P, so that L-shaped uncured resin layers L are also formed on the second end surface E2. As a result, the uncured resin layers L are formed at four locations on the surfaces of the ceramic body 11.

3.3.3 Step S33: Thermosetting Treatment

In Step S33, the uncured resin layers L formed are cured by heat treatment. The temperature of heat treatment can be set to approximately 100 to 500° C., for example. The heat treatment can be performed in a reduction atmosphere or a low-oxygen partial pressure atmosphere, for example. Thus, the uncured resin layers L are thermally cured, so that the first and second conductive resin layers 151 and 152 are formed.

3.3.4 Step S34: Formation of Plating Layer

In Step S34, plating layers 16 are formed by wet plating treatment on the base layers 14 and the first and second conductive resin layers 151 and 152 formed on the ceramic body 11. Thus, the first and second external electrodes 13a and 13b are completed. Since the plating layers 16 having a uniform thickness are formed by the wet plating treatment, the steps Ds and De resulting from the above-mentioned shapes of the first and second conductive resin layers 151 and 152 are formed on the first and second external electrodes 13a and 13b.

3.4 Modified Examples

The production method described above can be variously modified as long as the configuration of the multi-layer ceramic capacitor 10 of this embodiment can be obtained. For example, the method of forming the first and second external electrodes 13a and 13b is not limited to the method described above as long as the base layer 14 and the first and second conductive resin layers 151 and 152 can be formed.

The uncured resin paste P forming the intermediate films La as shown in FIGS. 10A to 10C can contain the smaller amount of metal powder than the uncured resin paste P shown in FIGS. 10D to 10F. This makes it possible to reduce the amount of metal at portions extending in the X-axis direction of the first and second conductive resin layers 151 and 152 (the first and second side surface resin portions 151s and 152s and the first and second main surface resin portions 151m and 152m). Therefore, in a moisture resistance test, the following failure can be reduced, in which the metal powder of the first and second conductive resin layers 151 and 152 is diffused on the ceramic body 11 to cause an electrical conduction of the first and second external electrodes 13a and 13b facing each other in the X-axis direction.

II Second Embodiment

The first and second external electrodes are not limited to the configuration of the first embodiment described above. For example, it is also possible to change the shape of the base layer.

Figure 11:
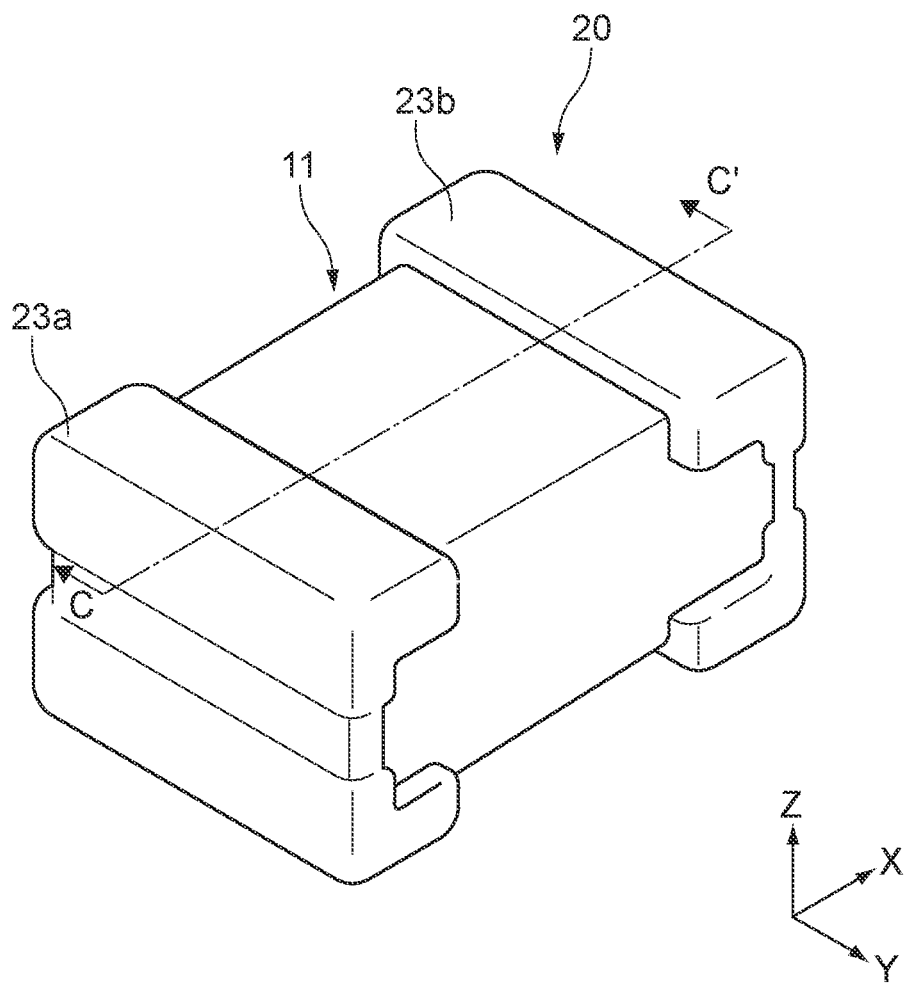
FIG. 11 is a perspective view of a multi-layer ceramic capacitor according to a second embodiment of the present disclosure.
Figure 12:
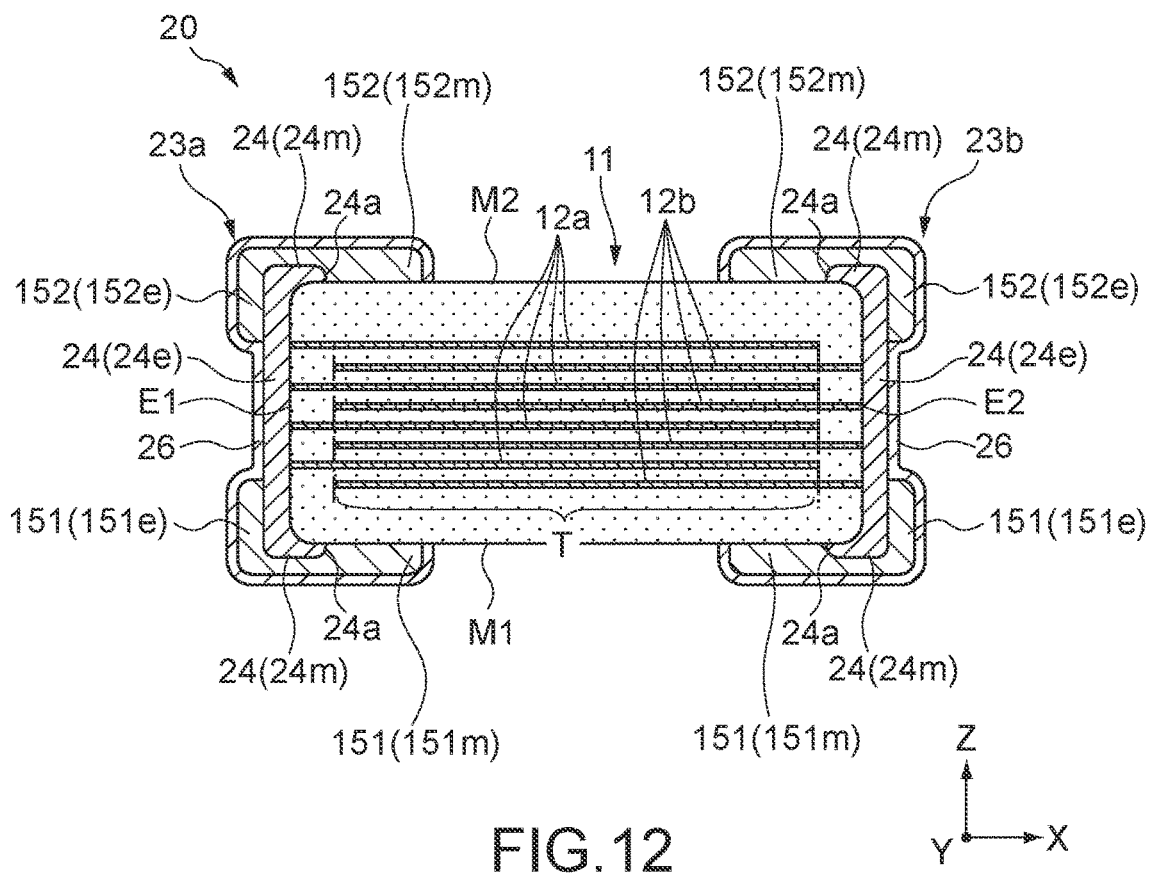
FIG. 12 is a cross-sectional view of the multi-layer ceramic capacitor taken along the line C-C' of FIG. 11.
Figure 13:
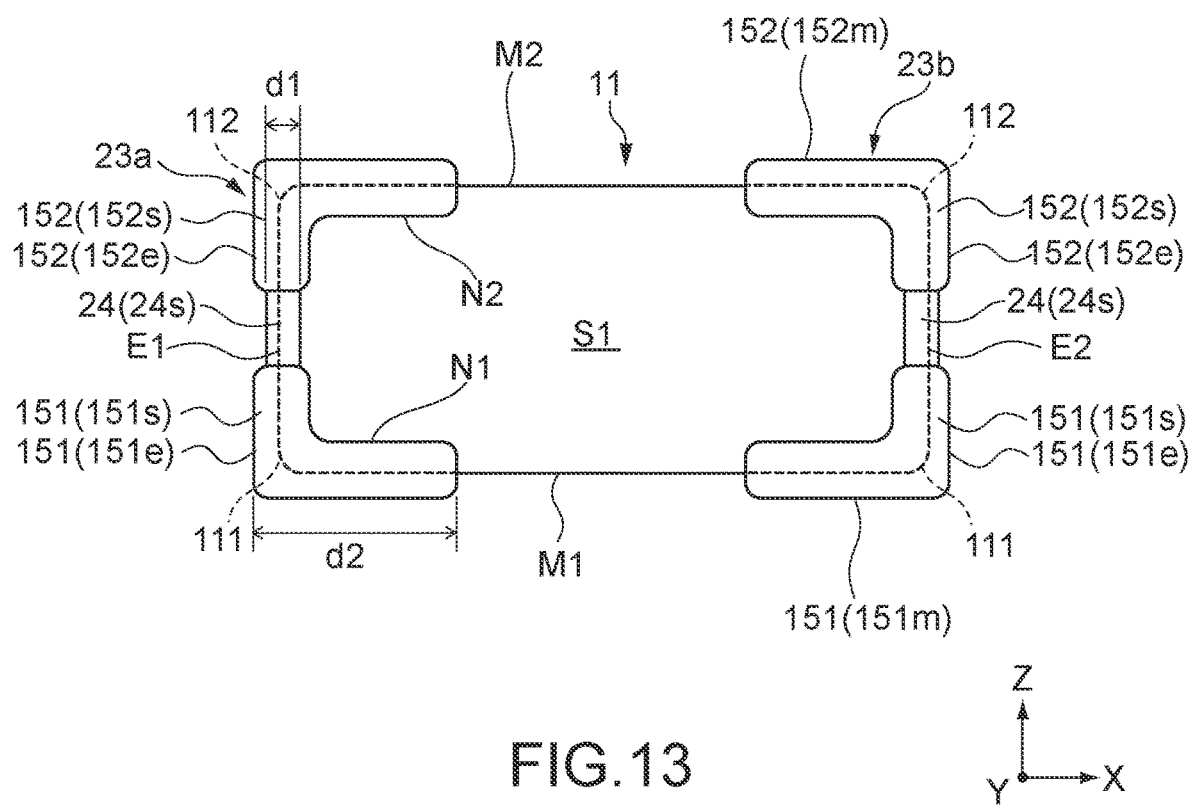
FIG. 13 is a side view of the multi-layer ceramic capacitor as viewed from the third axis direction, in which a plating layer is removed from the external electrode.

FIGS. 11 to 13 are views of a multi-layer ceramic capacitor 20 according to a second embodiment of the present disclosure. FIG. 11 is a perspective view of the multi-layer ceramic capacitor 20. FIG. 12 is a cross-sectional view of the multi-layer ceramic capacitor 20 taken along the line C-C' of FIG. 11. FIG. 13 is a side view of the multi-layer ceramic capacitor 20 as viewed from the Y-axis direction, in which plating layers 26 are removed from external electrodes 23a and 23b to be described later.

The constituent elements similar to those of the first embodiment described above will be denoted by the same reference symbols, and the description thereof will be omitted.

The multi-layer ceramic capacitor 20 according to this embodiment includes a ceramic body 11 similar to that of the first embodiment and includes first and second external electrodes 23a and 23b having a configuration different from that of the first embodiment.

Specifically, each of the first and second external electrodes 23a and 23b includes first and second conductive resin layers 151 and 152 similar to those of the first embodiment and includes a base layer 24 having a configuration different from that of the first embodiment. The configuration of the plating layer 26 is also different from that of the plating layer 16 of the first embodiment accordingly.

Note that the multi-layer ceramic capacitor 20 of this embodiment also has the symmetry with respect to the X-axis, the Y-axis, and the Z-axis as in the first embodiment.

Similarly to the first embodiment, the base layer 24 includes an end surface base portion 24e disposed on the first end surface E1, side surface base portions 24s disposed on the first and second side surfaces S1 and S2, and main surface base portions 24m disposed on the first and second main surfaces M1 and M2.

Meanwhile, as shown in FIG. 13, a dimension d1 of the side surface base portion 24s in the X-axis direction may be 50% or less of a dimension d2 of the first side surface resin portion 151s in the X-axis direction, and may further be 30% or less or 20% or less of the dimension d2. Note that the above-mentioned dimension d1 of the base layer 24 may be 50% or less of the dimension of the second side surface resin portion 152s in the X-axis direction, and may further be 30% or less or 20% or less of the dimension of the second side surface resin portion 152s on the basis of the symmetry of the multi-layer ceramic capacitor 20 with respect to the X-axis.

With the above-mentioned configuration, the length of the base layer 24 in the X-axis direction, which has a lower deflection strength than the first and second conductive resin layers 151 and 152, can be sufficiently shortened. This makes it possible to cover end portions 24a of the base layers 24 in the X-axis direction with the first and second conductive resin layers 151 and 152 having a high deflection strength, and additionally arrange the end portions 24a outwardly in the X-axis direction, that is, closer to the first and second end surfaces E1 and E2, with respect to the opposing region T including the first and second internal electrodes 12a and 12b (see FIG. 12).

The opposing region T is a region where the first and second internal electrodes 12a and 12b face each other in the Z-axis direction with the ceramic layers interposed therebetween, and is a region that contributes to capacity formation. If the cracks in the ceramic body 11 reach the opposing region T, an electrical failure such as a short circuit may occur, and the multi-layer ceramic capacitor 20 may break down. The above-mentioned configuration makes it possible to suppress the generation of cracks extending from the boundary between the end portion 24a of the base layer 24 and the ceramic body 11, and additionally reliably suppress the cracks from extending from the base layer 24 to the opposing region T including the first and second internal electrodes 12a and 12b. Therefore, failures such as the degradation of moisture resistance and a short circuit can be suppressed more effectively.

Further, the plating layer 26 is formed to cover the base layer 24 and the first and second conductive resin layers 151 and 152. Thus, the contour of the plating layer 26 is formed along the contour combining the base layers 24 and the first and second conductive resin layers 151 and 152. Thus, the contour of the portion of the plating layer 26, which covers the first and second side surfaces S1 and S2, has an L-shaped shape along the shape of each of the first and second side surface resin portions 151s and 152s.

Figure 14:
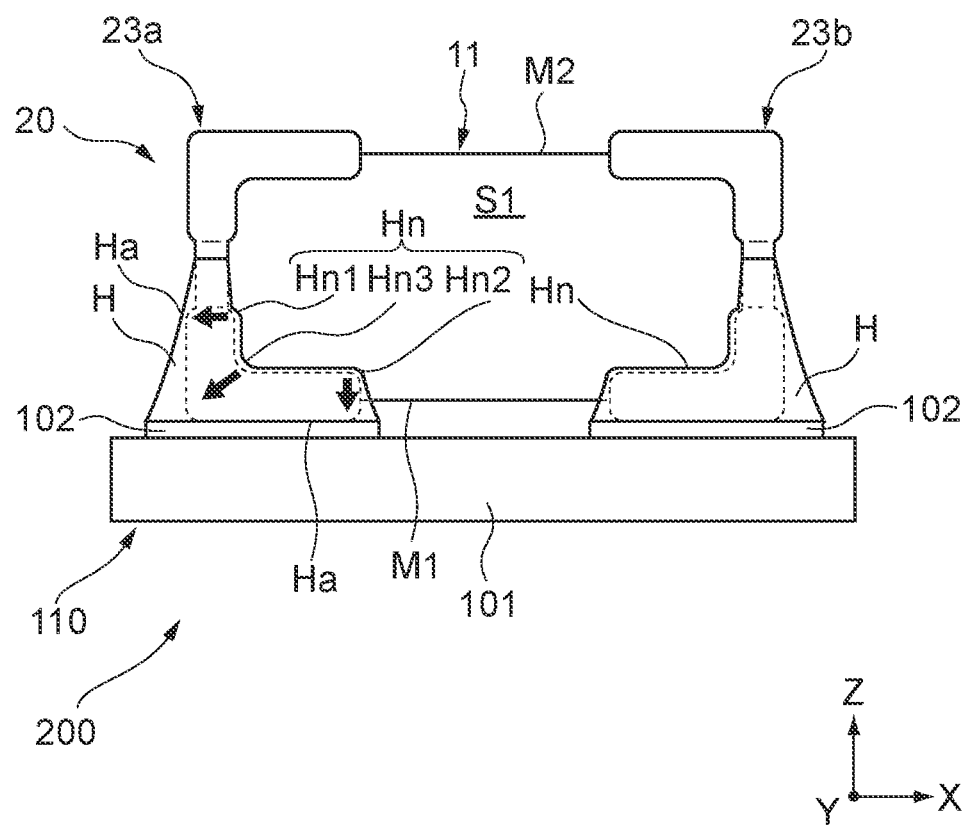
FIG. 14 is a side view of a circuit board on which the multi-layer ceramic capacitor is mounted.

FIG. 14 is a side view of a circuit board 200 including the multi-layer ceramic capacitor 20. Similarly to the first embodiment, in the circuit board 200, the multi-layer ceramic capacitor 20 is connected to connection electrodes 102 of a mounting substrate 110 via solder H.

As described above, the solder H, which has been molten at the time of mounting, wets and spreads upwardly along the surface of the plating layer 26. In this embodiment, the first side surface resin portion 151s of the first conductive resin layer 151 and the plating layer 26 covering it are configured to be L-shaped, and along such an L shape, the solder H having reached each of the first and second side surfaces S1 and S2 wets and spreads toward the center in the X-axis direction. Thus, the solder H can be sufficiently distributed to the vicinity of the end portion adjacent to the center of the first conductive resin layer 151 in the X-axis direction. Therefore, when the solder H is solidified, the stress resulting from the solder H is distributed, and the cracks in the ceramic body 11 are suppressed from occurring.

Further, the solder H, which covers the first and second side surfaces S1 and S2, also includes a solder inner edge Hn substantially L-shaped along the inner edge N1 of the first side surface resin portion 151s. In other words, the solder inner edge Hn includes a first end portion Hn1 upwardly in the Z-axis direction, a second end portion Hn2 adjacent to the center in the X-axis direction, and a middle portion Hn3 curved into the L shape between the first end portion Hn1 and the second end portion Hn2.

This makes it possible to more effectively distribute the stress caused by the solder H covering the first and second side surfaces S1 and S2 and more reliably suppress the generation of cracks, as shown using the following comparison example.

Figure 15A:
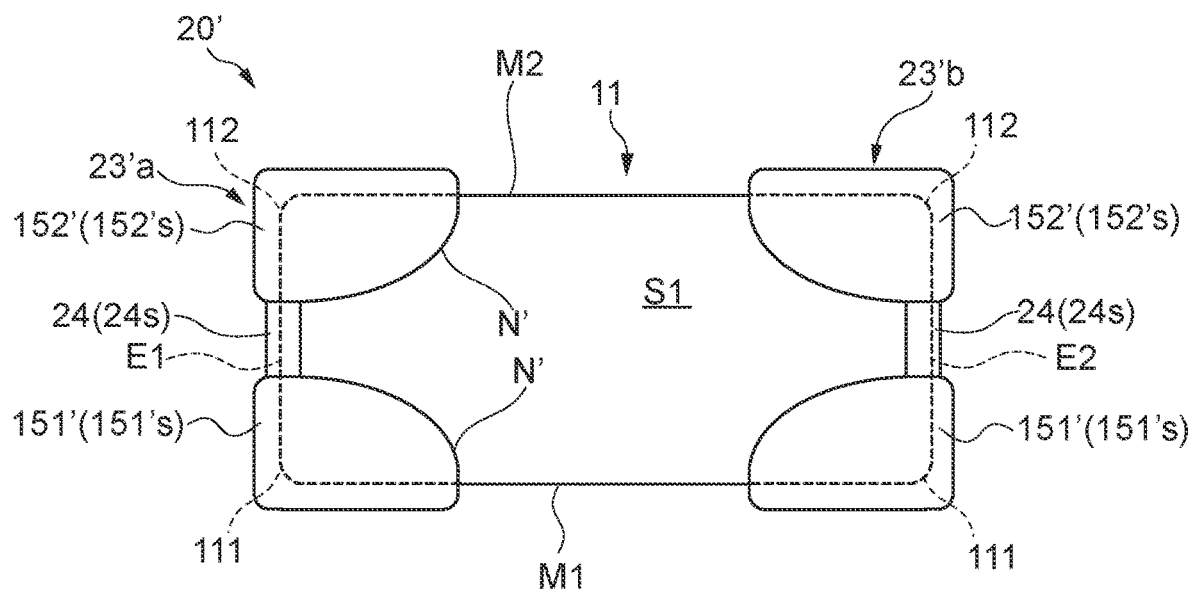
FIG. 15A is a side view of a multi-layer ceramic capacitor according to a comparison example of the second embodiment as viewed from the third axis direction, in which a plating layer is removed from the external electrode.

FIG. 15A is a side view of a multi-layer ceramic capacitor 20' according to a comparison example of this embodiment as viewed from the Y-axis direction, in which plating layers are removed from external electrodes 23' and 23'b.

Each of the external electrodes 23'a and 23'b includes a base layer 24 similar to that of this embodiment and first and second conductive resin layers 151' and 152'. The first and second conductive resin layers 151' and 152' include first and second side surface resin portions 151's and 152's, each of which includes an inner edge N' that is curved convexly in the direction opposite to the corner 111 or 112.

Figure 15B:
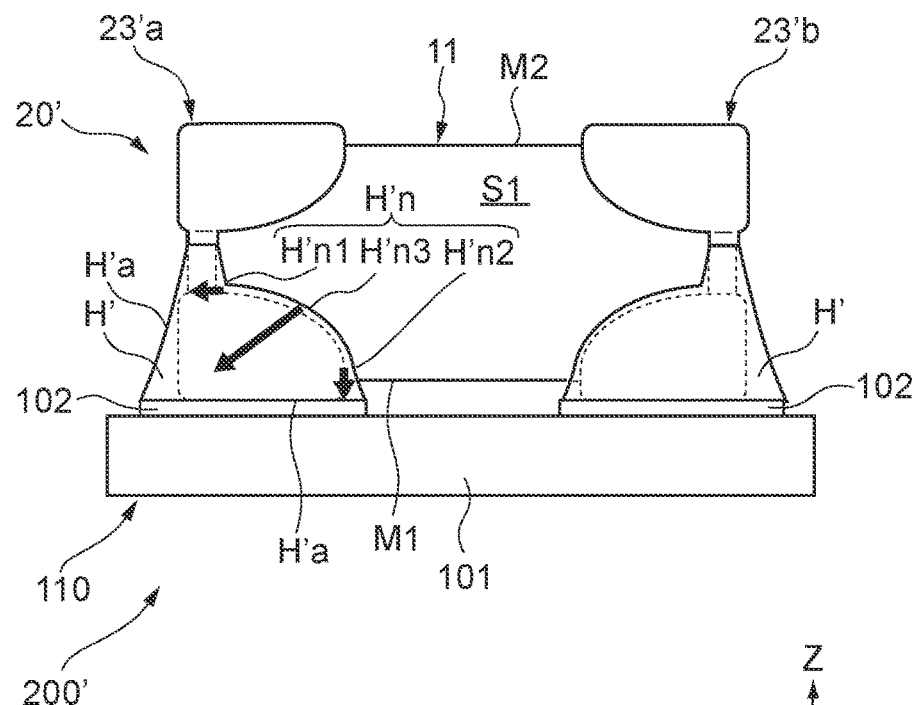
FIG. 15B is a side view of a circuit board on which the multi-layer ceramic capacitor is mounted.

FIG. 15B is a side view of a circuit board 200' including the multi-layer ceramic capacitor 20'.

As shown in FIG. 15B, the solder H', which covers the first and second side surfaces S1 and S2, includes a solder inner edge H'n having the shape along the convex inner edge N'. The solder inner edge H'n includes a first end portion H'n1 upwardly in the Z-axis direction, a second end portion H'n2 adjacent to the center in the X-axis direction, and a middle portion H'n3 between the first end portion H'n1 and the second end portion H'n2.

When the solder H' is solidified, stress may occur between the solder inner edge H'n and the surface of the solder H', and/or between the solder inner edge H'n and the boundary between the solder H' and the connection electrode 102. The surface of the solder H' and the boundary between the solder H' and the connection electrode 102 will also be referred to as a circumference portion H'a of the solder H'.

When the solder H' contracts, the stress in the direction toward the circumference portion H'a of the solder H' (see the arrows of the figure) may occur in each of the external electrodes 23'a and 23'b. For example, the stress along the X-axis direction toward the surface of the solder H' occurs in the first end portion H'n1 of the solder inner edge H'n. The stress along the Z-axis direction toward the connection electrode 102 occurs in the second end portion H'n2 of the solder inner edge H'n. The stress obliquely downwardly in the Z-axis direction toward the surface of the solder H' and the connection electrode 102 occurs in the middle portion H'n3 of the solder inner edge H'n.

As shown in FIG. 15B, the middle portion H'n3 of the above comparison example has a larger distance to the circumference portion H'a of the solder H' than the first and second end portions H'n1 and H'n2, and has a larger shrinkage amount of the solder H' located between the middle portion H'n3 and the circumference portion H'a. This may cause the stress to easily concentrate at the middle portion H'n3 and may cause cracks in the ceramic body 11 due to the stress.

On the other hand, as shown in FIG. 14, the circuit board 200 of this embodiment includes the solder H covering the first and second side surfaces S1 and S2 and having the solder inner edge Hn, which is curved into the L shape. This shape restricts the distance from the middle portion Hn3 to the circumference portion Ha of the solder H and suppresses the shrinkage amount of the solder H between the middle portion Hn3 and the circumference portion Ha. Therefore, as shown by the arrows in the figure, the difference in magnitude of the stress applied to the first end portion Hn1, the second end portion Hn2, and the middle portion Hn3 decreases, and the stress starting from the solder inner edge Hn is effectively distributed. As a result, the generation of cracks resulting from the solder H in the ceramic body 11 is suppressed more reliably.

In addition, also in this embodiment, the curvature N13 of the inner edge N1 of the first side surface resin portion 151s is round and is not square-shaped. This prevents the solder H from excessively accumulating at the square-shaped portion to prevent the stress from concentrating, which makes it possible to more reliably distribute the stress starting from the solder inner edge Hn.

III Third Embodiment

The embodiments described above have described the configuration in which each external electrode includes two conductive resin layers, but the present disclosure is not limited thereto. For example, each external electrode may include four conductive resin layers as will be described in the following third embodiment.

1. Configuration of Multi-Layer Ceramic Capacitor

Figure 16:
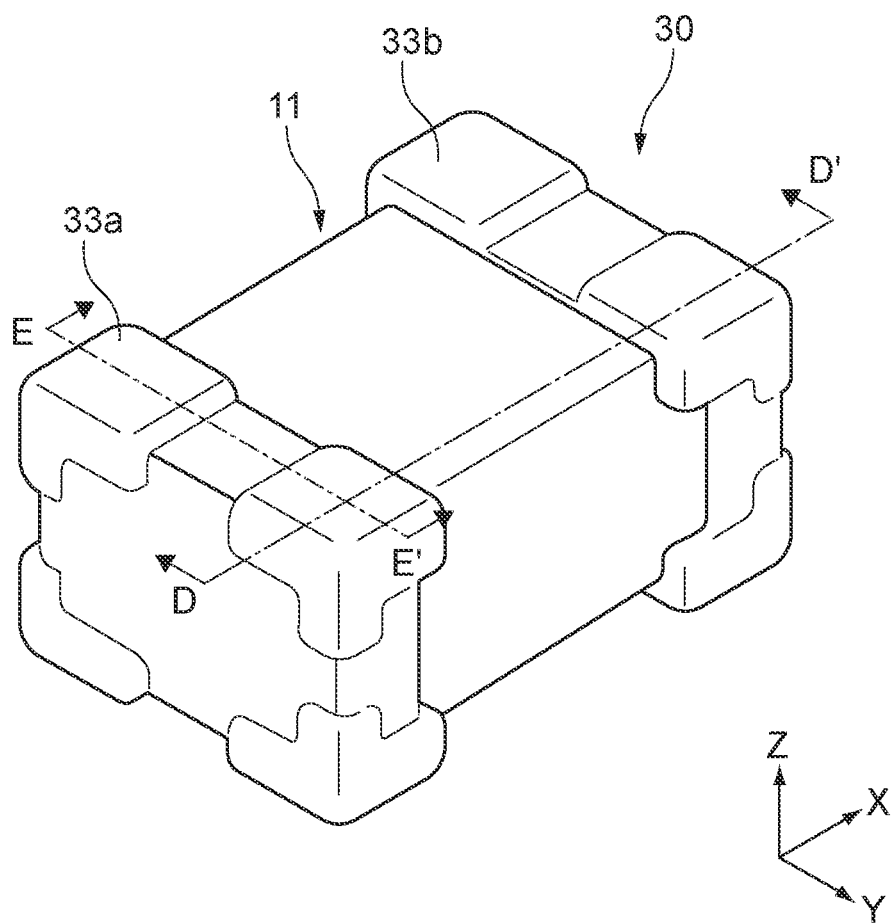
FIG. 16 is a perspective view of a multi-layer ceramic capacitor according to a third embodiment of the present disclosure.
Figure 17:
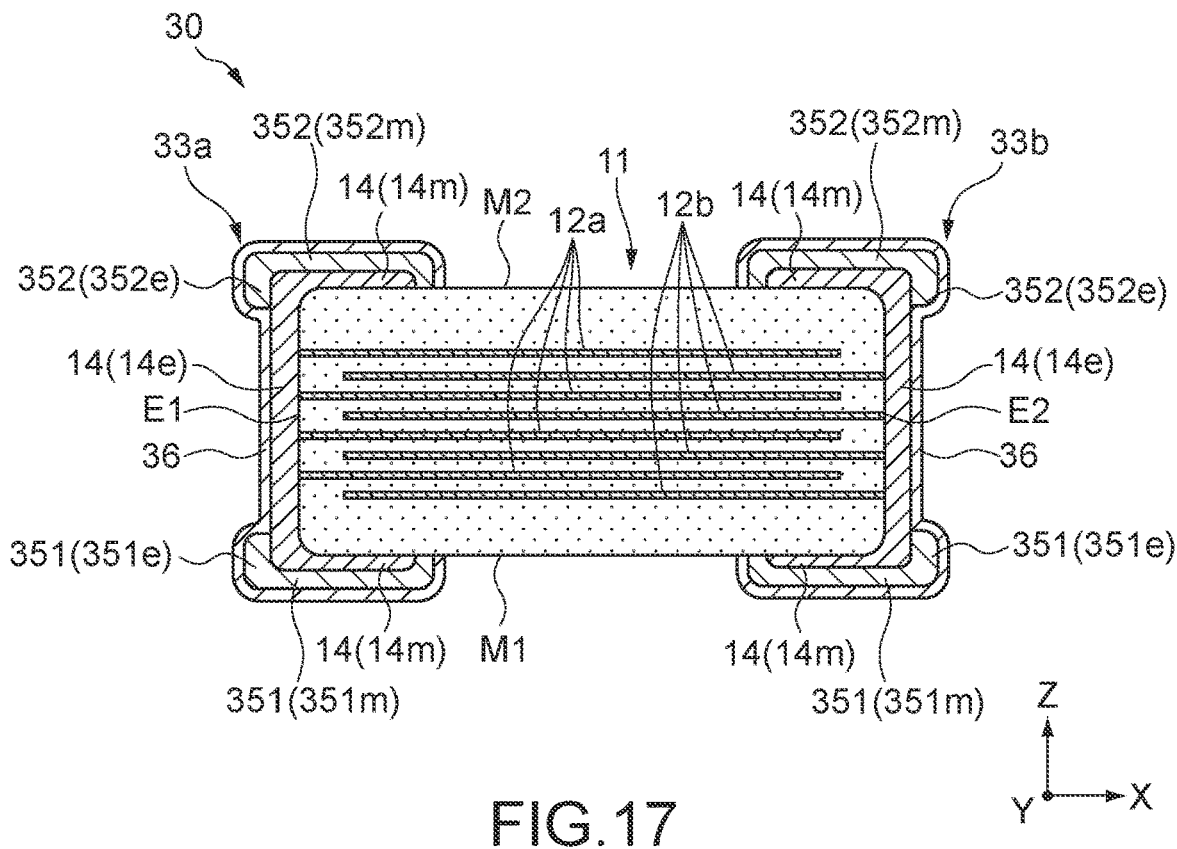
FIG. 17 is a cross-sectional view of the multi-layer ceramic capacitor taken along the line D-D' of FIG. 16.
Figure 18:
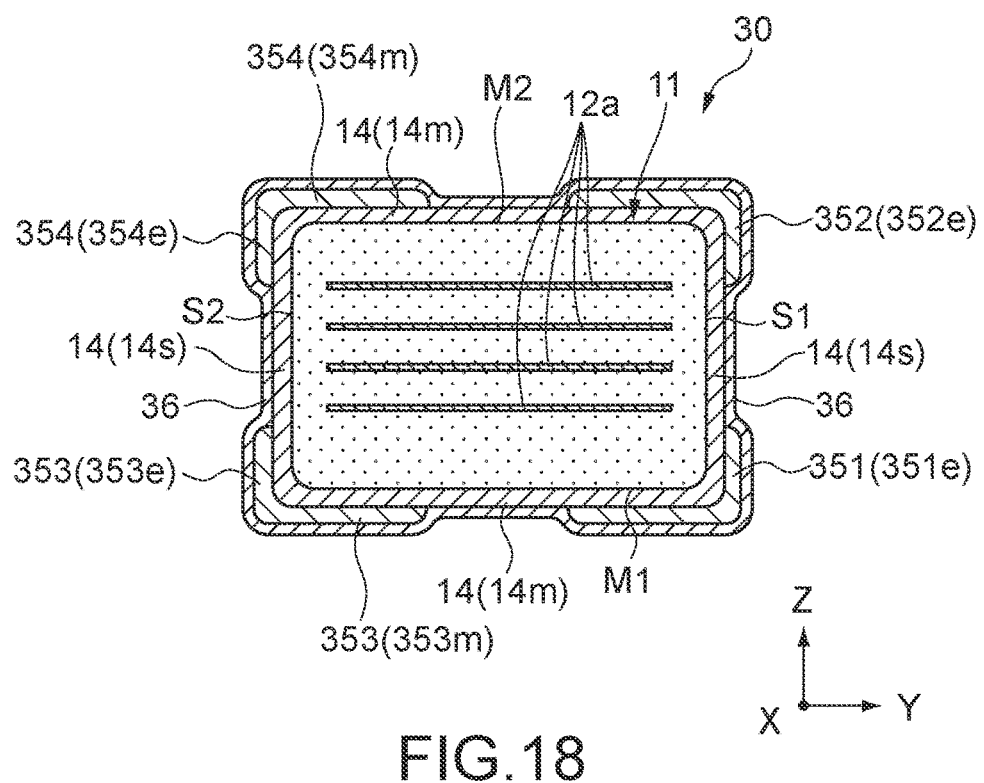
FIG. 18 is a cross-sectional view of the multi-layer ceramic capacitor taken along the line E-E' of FIG. 16.

FIGS. 16 to 20 are views of a multi-layer ceramic capacitor 30 according to a third embodiment of the present disclosure. FIG. 16 is a perspective view of the multi-layer ceramic capacitor 30. FIG. 17 is a cross-sectional view of the multi-layer ceramic capacitor 30 taken along the line D-D' of FIG. 16. FIG. 18 is a cross-sectional view of the multi-layer ceramic capacitor 30 taken along the line E-E' of FIG. 16. FIG. 19A is a side view of the multi-layer ceramic capacitor 30 as viewed from the Y-axis direction (the first side surface S1), in which plating layers 36 are removed from external electrodes 33a and 33b. FIG. 19B is a side view of the multi-layer ceramic capacitor 30 as viewed from the Y-axis direction (the second side surface S2), showing the from similar to that of FIG. 19A. FIG. is a side view of the multi-layer ceramic capacitor 30 as viewed from the X-axis direction, in which the plating layers 36 are removed from the external electrodes 33a and 33b to be described later.

In the following description, the constituent elements similar to those of the first embodiment described above will be denoted by the same reference symbols, and description thereof will be omitted.

Further, the multi-layer ceramic capacitor 30 of this embodiment also has the symmetry with respect to the X-axis, the Y-axis, and the Z-axis as in the first embodiment.

The multi-layer ceramic capacitor 30 according to this embodiment includes a ceramic body 11 similar to that of the first embodiment and includes first and second external electrodes 33a and 33b having a different configuration from that of the first embodiment.

Specifically, the first and second external electrodes 33a and 33b each include a base layer 14 configured similarly to that of the first embodiment, a conductive resin layer configured to be different from that of the first embodiment, and a plating layer 36 that covers the base layer 14 and the conductive resin layer. The first and second external electrodes 33a and 33b each include first and second conductive resin layers 351 and 352, and a third conductive resin layer 353 and a fourth conductive resin layer 354 as well. In other words, each of the first and second external electrodes 33a and 33b includes four conductive resin layers 351, 352, 353, and 354 that cover the four corners 111 to 114, respectively.

The first to fourth conductive resin layers 351 to 354 cover at least part of the base layer 14.

In this embodiment, the first conductive resin layer 351 covers the first corner 111 and is formed to extend from the first corner 111 along the X-axis, the Y-axis, and the Z-axis directions.

The second conductive resin layer 352 covers the second corner 112 and is formed to extend from the second corner 112 along the X-axis, the Y-axis, and the Z-axis directions. The second conductive resin layer 352 is apart from the first conductive resin layer 351 in the Z-axis direction.

The third conductive resin layer 353 covers the third corner 113 and is formed to extend from the third corner 113 along the X-axis, the Y-axis, and the Z-axis directions. The third conductive resin layer 353 is apart from the first conductive resin layer 351 in the Y-axis direction.

The fourth conductive resin layer 354 covers the fourth corner 114 and is formed to extend from the fourth corner 114 along the X-axis, the Y-axis, and the Z-axis directions. The fourth conductive resin layer 354 is apart from the third conductive resin layer 353 in the Z-axis direction and apart from the second conductive resin layer 352 in the Y-axis direction.

Note that in the following description the configuration of the first external electrode 33a will be mainly described, but the second external electrode 33b is also configured similarly on the basis of the symmetry of the multi-layer ceramic capacitor 30.

Figure 19A:
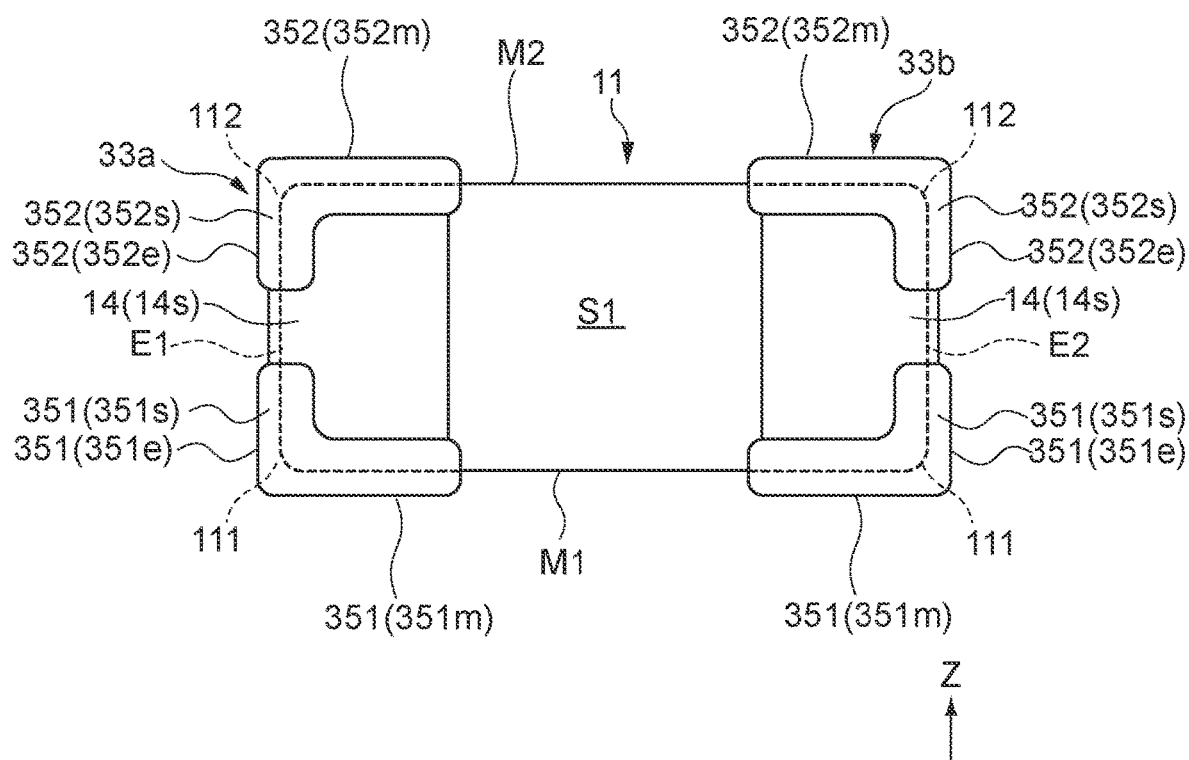
FIG. 19A is a side view of the multi-layer ceramic capacitor as viewed from the third axis direction (the first side surface), in which a plating layer is removed from the external electrode.

As shown in FIG. 19A, a first side surface resin portion 351s of the first conductive resin layer 351 is disposed on the first side surface S1 to cover the first corner 111, and has a planar shape extending from the first corner 111 in the Z-axis direction and the X-axis direction. In other words, the first side surface resin portion 351s has an L-shaped planar shape as viewed from the Y-axis direction. Further, the first side surface resin portion 351s is configured in a similar manner to the first side surface resin portion 151s of the first embodiment.

Figure 20:
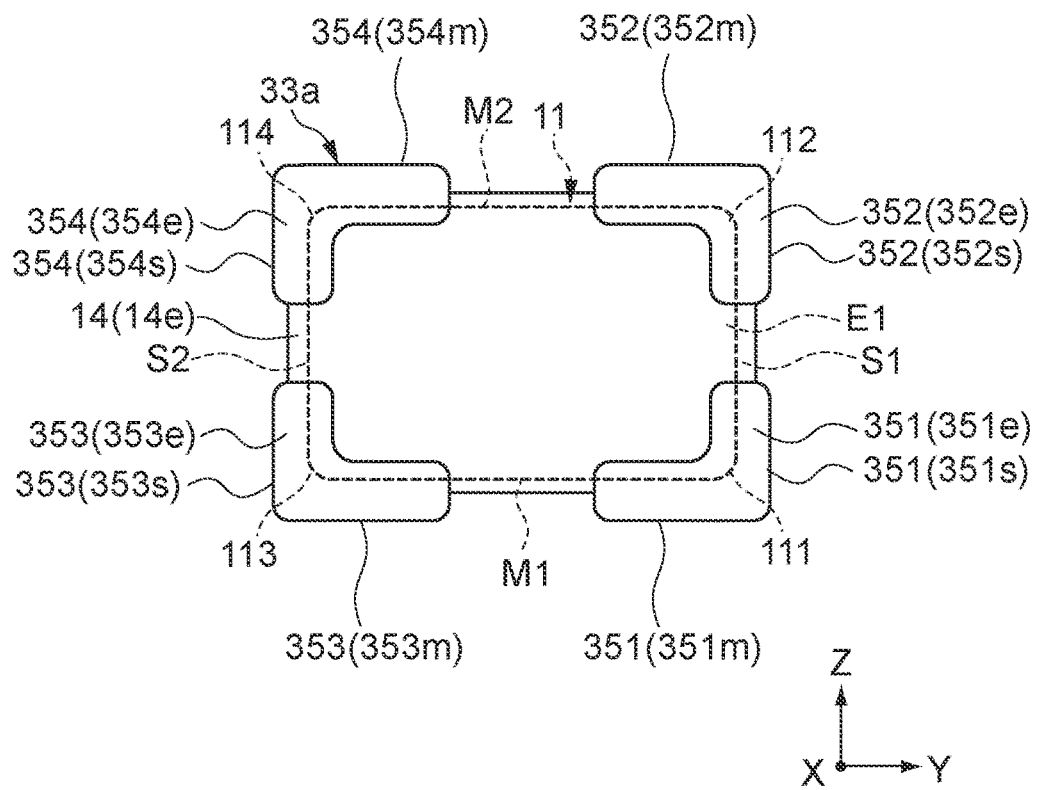
FIG. 20 is a side view of the multi-layer ceramic capacitor as viewed from the second axis direction, in which a plating layer is removed from the external electrode.

Meanwhile, as shown in FIG. 20, a first end surface resin portion 351e of the first conductive resin layer 351 is also disposed on the first end surface E1 to cover the first corner 111, and has a planar shape extending from the first corner 111 in the Z-axis direction and the Y-axis direction. In other words, the first end surface resin portion 351e has an L-shaped planar shape as viewed from the X-axis direction. The first end surface resin portion 351e does not reach the second side surface S2.

Note that a first main surface resin portion 351m of the first conductive resin layer 351 has substantially the same dimension in the X-axis direction as the dimension of the first side surface resin portion 351s, and has substantially the same dimension in the Y-axis direction as the dimension of the first end surface resin portion 351e. In other words, the first main surface resin portion 351m has a substantially rectangular planar shape as viewed from the Z-axis direction.

The second conductive resin layer 352 has a configuration symmetric with the first conductive resin layer 351 with respect to the Z-axis direction. In other words, as shown in FIG. 19A, a second side surface resin portion 352s is disposed on the first side surface S1 to cover the second corner 112, and has a planar shape extending from the second corner 112 in the Z-axis direction and the X-axis direction. In other words, the second side surface resin portion 352s has an L-shaped planar shape as viewed from the Y-axis direction. As shown in FIG. 20, a second end surface resin portion 352e is also disposed on the first end surface E1 to cover the second corner 112, and has a planar shape extending from the second corner 112 in the Z-axis direction and the Y-axis direction. In other words, the second end surface resin portion 352e also has an L-shaped planar shape as viewed from the X-axis direction. Similarly to the first main surface resin portion 351m, a second main surface resin portion 352m has a substantially rectangular planar shape as viewed from the Z-axis direction.

Figure 19B:
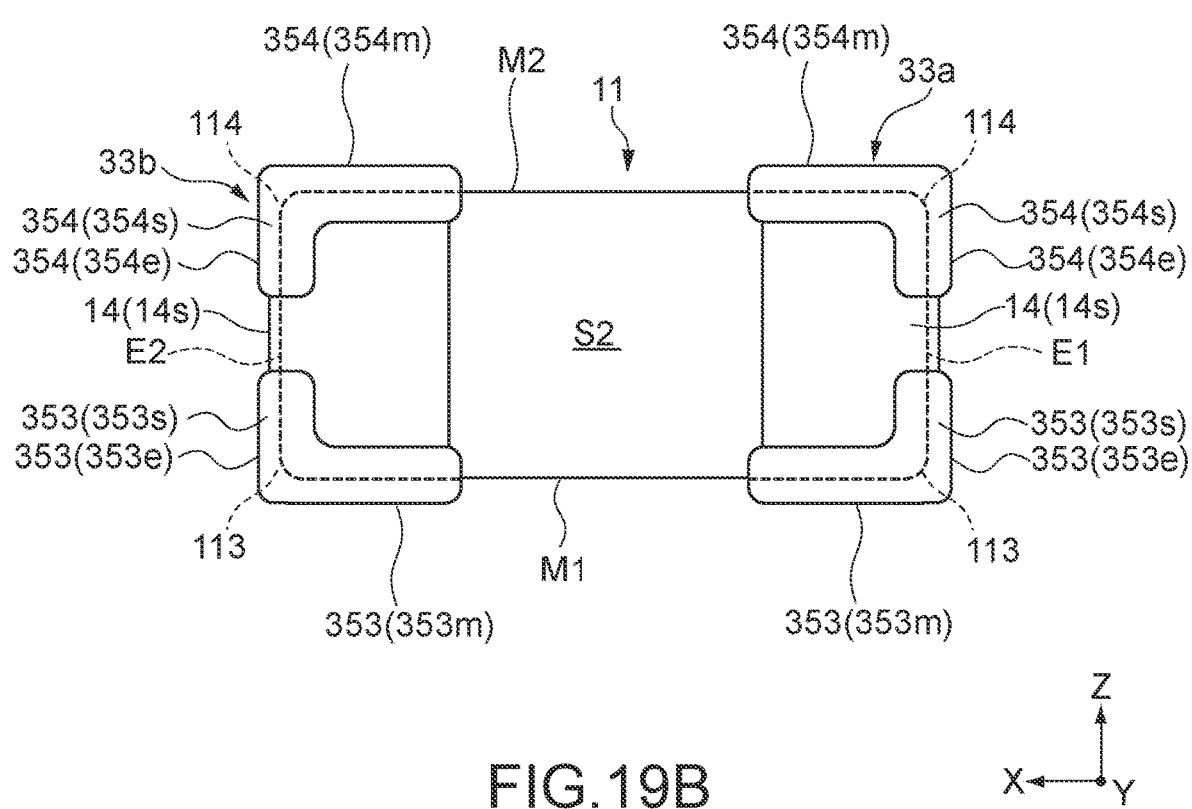
FIG. 19B is a side view of the multi-layer ceramic capacitor as viewed from the third axis direction (the second side surface), in which a plating layer is removed from the external electrode.

The third conductive resin layer 353 has a configuration symmetric with the first conductive resin layer 351 with respect to the Y-axis direction. In other words, as shown in FIG. 19B, a third side surface resin portion 353s of the third conductive resin layer 353 is disposed on the second side surface S2 to cover the third corner 113, and has a planar shape extending from the third corner 113 in the Z-axis direction and the X-axis direction. In other words, the third side surface resin portion 353s has an L-shaped planar shape as viewed from the Y-axis direction. As shown in FIG. 20, a third end surface resin portion 353e of the third conductive resin layer 353 is disposed on the first end surface E1 to cover the third corner 113, and has a planar shape extending from the third corner 113 in the Z-axis direction and the Y-axis direction. In other words, the third end surface resin portion 353e also has an L-shaped planar shape as viewed from the X-axis direction. Similarly to the first main surface resin portion 351m, a third main surface resin portion 353m of the third conductive resin layer 353 has a substantially rectangular planar shape as viewed from the Z-axis direction.

The fourth conductive resin layer 354 has a configuration symmetric with the third conductive resin layer 353 with respect to the Z-axis direction. In other words, as shown in FIG. 19B, a fourth side surface resin portion 354s of the fourth conductive resin layer 354 is disposed on the second side surface S2 to cover the fourth corner 114, and has a planar shape extending from the fourth corner 114 in the Z-axis direction and the X-axis direction. In other words, the fourth side surface resin portion 354s has an L-shaped planar shape as viewed from the Y-axis direction. As shown in FIG. 20, a fourth end surface resin portion 354e of the fourth conductive resin layer 354 is disposed on the first end surface E1 to cover the fourth corner 114, and has a planar shape extending from the fourth corner 114 in the Z-axis direction and the Y-axis direction. In other words, the fourth end surface resin portion 354e also has an L-shaped planar shape as viewed from the X-axis direction. Similarly to the first main surface resin portion 351m, a fourth main surface resin portion 354m of the fourth conductive resin layer 354 has a substantially rectangular planar shape as viewed from the Z-axis direction.

The first to fourth conductive resin layers 351 to 354 of this embodiment are formed by applying and curing an uncured resin paste P similarly to the first and second conductive resin layers 351 and 352 of the first embodiment.

For example, in FIGS. 10A to 10C of Step S32, the uncured resin paste P is disposed at a pair of locations on the front side in the Y-axis direction and also disposed at a pair of locations on the depth side in the Y-axis direction, that is, at four locations in total. The arrangement of the uncured resin paste P in the Y-axis direction is adjusted in consideration of the length of the first to fourth main surface resin portions 351m to 354m in the Y-axis direction. Thus, using the technique described with reference to FIGS. 10A to 10C, intermediate films La are formed at eight locations in total on the first main surface M1 and the second main surface M2.

Further, also in FIGS. 10D to 10F, the uncured resin paste P is disposed at a pair of locations on the front side in the Y-axis direction and also disposed at a pair of locations on the depth side in the Y-axis direction, that is, at four locations in total. The arrangement of the uncured resin paste P in the Y-axis direction is adjusted in consideration of the length of a short potion in the Y-axis direction of each of the first to fourth end surface resin portions 351e to 354e. Thus, using the technique described with reference to FIGS. 10D to 10F, L-shaped uncured resin layers L are formed at eight locations in total on the first end surface E1 and the second end surface E2.

The uncured resin layers L are cured in a similar manner to Step S33, so that the first to fourth conductive resin layers 351 to 354 are formed.

The multi-layer ceramic capacitor 30 of this embodiment is also mounted onto a mounting substrate 110 via solder H in a manner similar to the circuit board 100 shown in FIG. 6B.

In the multi-layer ceramic capacitor 30 having the configuration described above, the first and second external electrodes 33a and 33b each include the first to fourth conductive resin layers 351 to 354, and the first to fourth conductive resin layer 351 to 354 respectively include the first to fourth side surface resin portions 351s to 354s each having an L-shaped planar shape and the first to fourth end surface resin portions 351e to 354e each having an L-shaped planar shape. Thus, when the multi-layer ceramic capacitor 30 is mounted onto the mounting substrate 110 via the solder H, the molten solder H wets and spreads along the L-shaped inner edges of the first to fourth end surface resin portions 351e to 354e and the first to fourth side surface resin portions 351s to 354s.

In particular, in this embodiment, each of the end surface resin portions 351e to 354e is also formed into the L shape, and thus the length of the guide portion for the solder H on the first and second end surfaces E1 and E2 can be elongated. Thus, even if the amount of the solder H is large, it is possible to more reliably prevent the solder H from being unevenly distributed on the first and second end surfaces E1 and E2 and to reliably suppress generation of cracks in the ceramic body 11.

In addition, the multi-layer ceramic capacitor 30 having the configuration describe above uses a conductive resin in which the resistance value is more likely to increase than general metal materials, but the multi-layer ceramic capacitor 30 can prevent equivalent series resistance (ESR) from increasing as will be described later.

Figure 21:
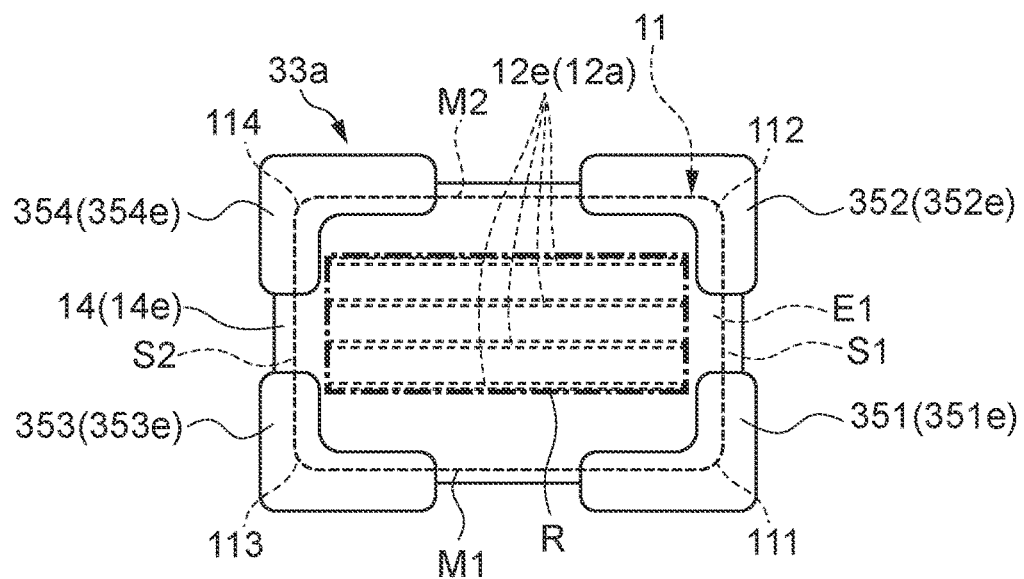
FIG. 21 is a side view of the multi-layer ceramic capacitor as viewed from the second axis direction, showing a positional relationship between the external electrode shown in FIG. 20 and end portions of internal electrodes exposed from a first end surface.

FIG. 21 is a side view schematically viewed from the X-axis direction, showing a positional relationship between the first external electrode 33a viewed from the first end surface E1 shown in FIG. 20 and end portions 12e of the first internal electrodes 12a in the X-axis direction, the end portions 12e being exposed from the first end surface E1.

As shown in the figure, the first end surface E1 includes a lead-out region R from which the end portions 12e of the first internal electrodes 12a are exposed. The lead-out region R is assumed to be a region surrounding the outer edge of all the end portions 12e exposed from each of the first and second end surfaces E1 and E2 and to include ceramic layers between the end portions 12e.

Note that the second end surface E2 is also assumed to include a lead-out region R from which the end portions 12e of the second internal electrode 12b in the X-axis direction are exposed, on the basis of the symmetry of the multi-layer ceramic capacitor 30 with respect to the X-axis.

In this embodiment, the overlap of the first end surface resin portion 351e and the lead-out region R is made very small in a planar view from the X-axis direction. In particular, as shown in FIG. 21, it is favorable that the first end surface resin portion 351e does not overlap with the lead-out region R in the planar view. Similarly, the overlap of the second to fourth end surface resin portions 352e to 354e and the lead-out region R is made very small in a planar view from the X-axis direction, and it is favorable that the second to fourth end surface resin portions 352e to 354e do not overlap with the lead-out region R. Specifically, it is favorable that the area of the overlapping portion of the first end surface resin portion 351e and the lead-out region R in a planar view from the X-axis direction is 10% or less of the area of the first end surface resin portion 351e in the planar view.

This configuration makes it possible to provide a wide current pathway, which avoids the first to fourth conductive resin layers 351 to 354, between the mounting substrate 110 and the first and second internal electrodes 12a and 12b, after mounting via the solder H. Therefore, the increase of ESR due to a current passing through the first to fourth conductive resin layers 351 to 354 can be suppressed.

2. Modified Example 1

Figure 22:
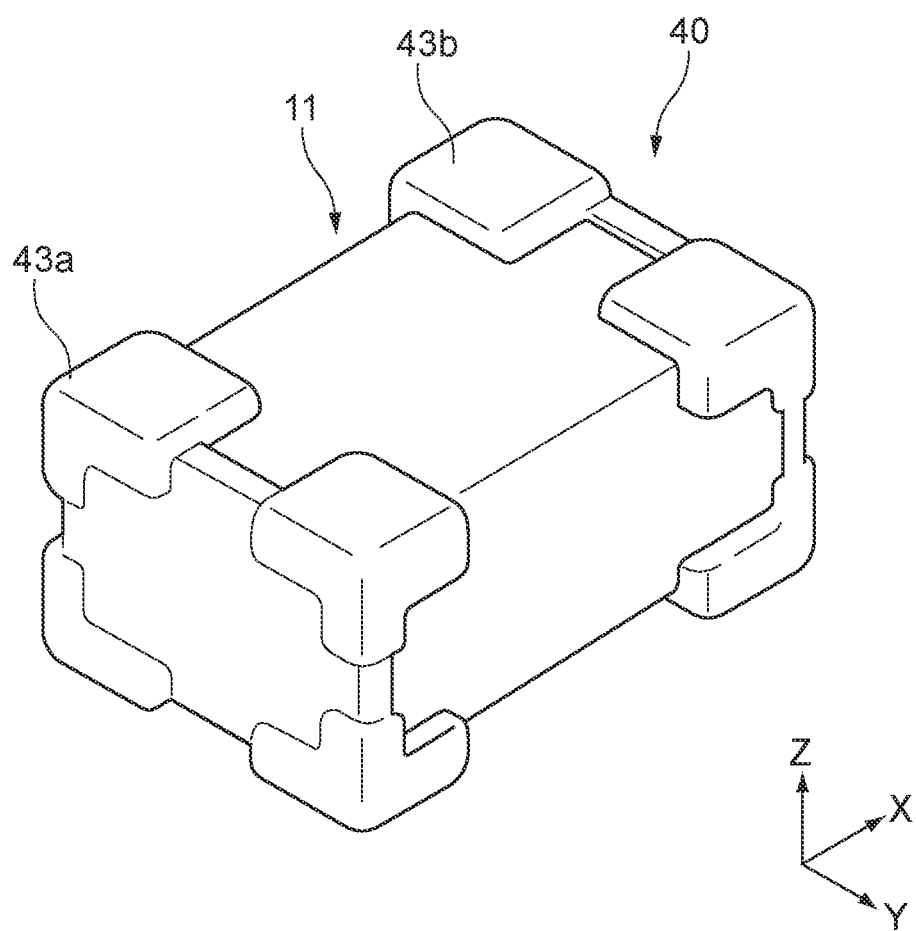
FIG. 22 is a perspective view of a multi-layer ceramic capacitor according to a modified example of the third embodiment of the present disclosure.

As shown in FIG. 22, the base layer 14 of this embodiment may be changed to the base layer 24 as in the second embodiment.

Figure 23:
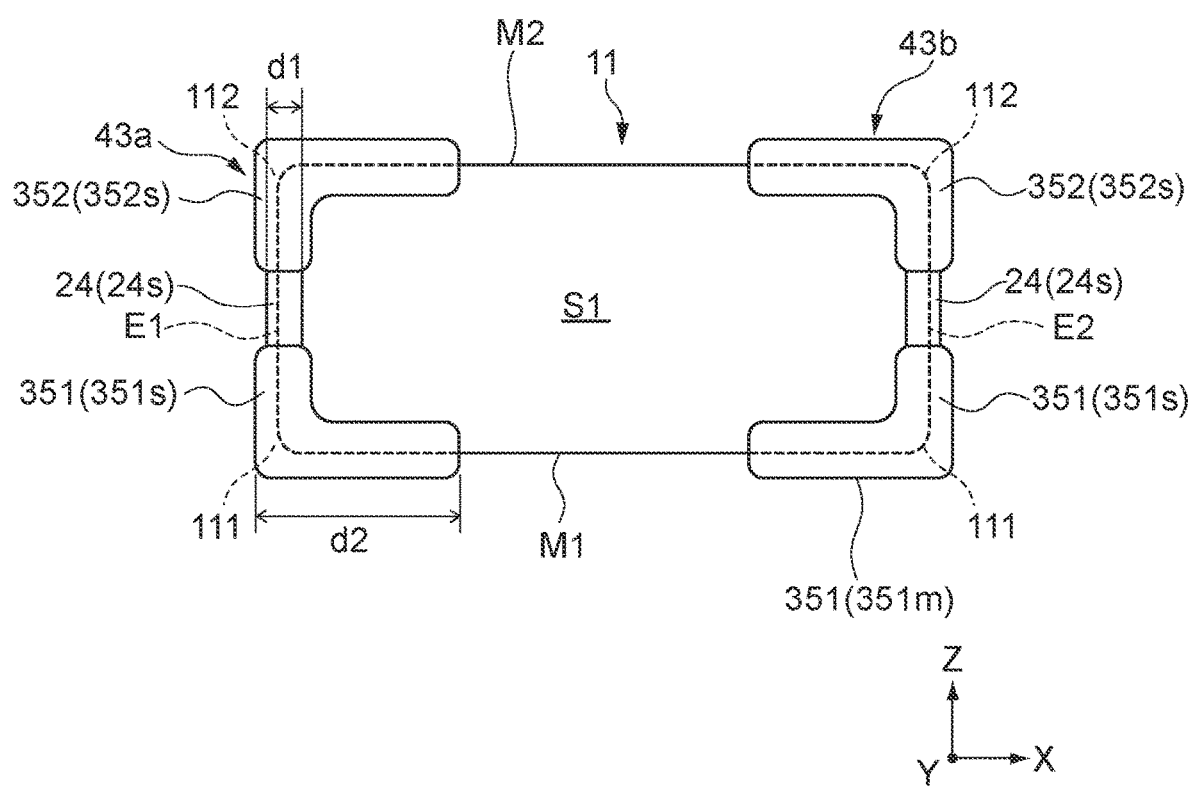
FIG. 23 is a side view of the multi-layer ceramic capacitor as viewed from the third axis direction, in which a plating layer is removed from the external electrode.

FIGS. 22 and 23 are views of a multi-layer ceramic capacitor 40 according to a modified example of this embodiment. FIG. 22 is a perspective view of the multi-layer ceramic capacitor 40. FIG. 23 is a side view of the multi-layer ceramic capacitor 40 as viewed from the Y-axis direction, in which plating layers are removed from external electrodes 43a and 43b.

The external electrodes 43a and 43b of this modified example include base layers 24 similar to those of the second embodiment, first to fourth conductive resin layers 351 to 354 similar to those of the third embodiment, and plating layers (not shown) that cover them.

As shown in FIG. 23, in this modified example as well, a dimension d1 of a side surface base portion 24s of the base layer 24 in the X-axis direction may be 50% or less of a dimension d2 of the first side surface resin portion 351s in the X-axis direction, and may further be 30% or less or 20% or less of the dimension d2. Note that the above-mentioned dimension d1 of the base layer 24 may be 50% or less of the dimension of the second to fourth side surface resin portions 352s to 354s in the X-axis direction, and may further be 30% or less or 20% or less of the above dimension on the basis of the symmetry of the multi-layer ceramic capacitor 40 with respect to the X-axis.

This configuration provides, in addition to the operative effect of preventing the solder H from being unevenly distributed and preventing the increase of ESR described in the third embodiment, the effect of suppressing extension of cracks to the opposing region T including the first and second internal electrodes 12a and 12b and the effect of distributing the stress due to the L-shaped solder H described in the second embodiment. Therefore, the reliability of the multi-layer ceramic capacitor 40 can be further enhanced.

3. Modified Example 2

The first and second internal electrodes 12a and 12b may be alternately laminated along the Y-axis direction. This configuration also makes it possible to provide the above-mentioned operative effect.

Figure 24:
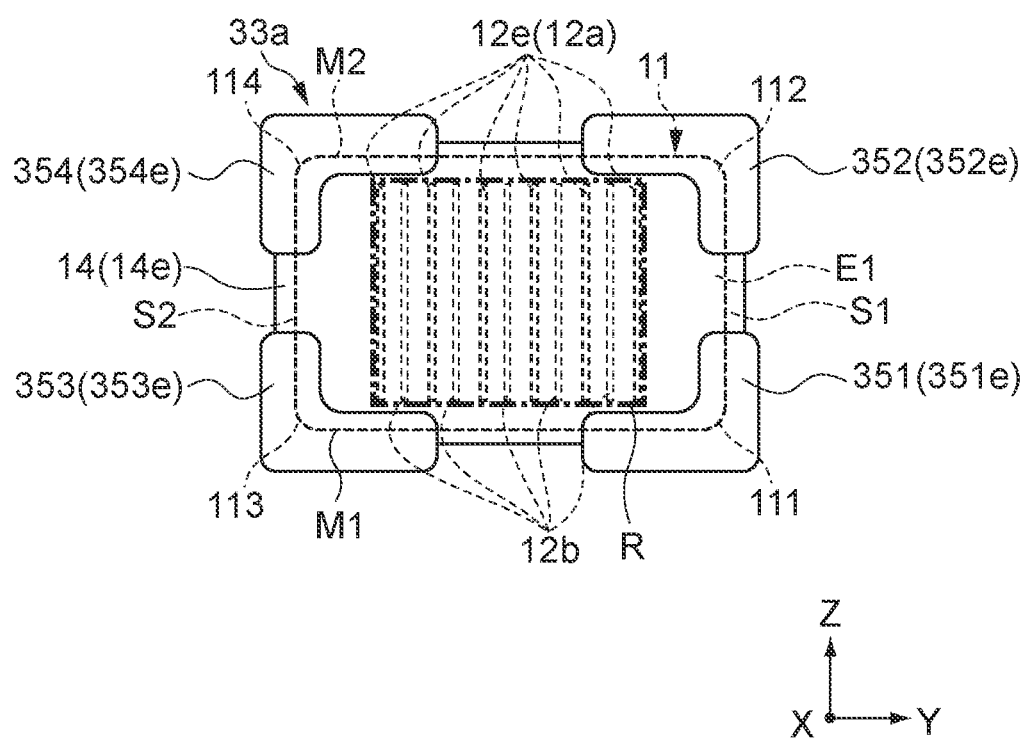
FIG. 24 is a side view of a multi-layer ceramic capacitor according to another modified example of the third embodiment of the present disclosure as viewed from the second axis direction, in which a plating layer is removed from the external electrode.

FIG. 24 is a side view as viewed from the X-axis direction, in which the lamination direction of the first and second internal electrodes 12a and 12b of the multi-layer ceramic capacitor 30 according to the third embodiment is changed to the Y-axis direction and in which the plating layers 36 are removed from the external electrodes 33a and 33b. FIG. 24 shows the arrangement of the second internal electrodes 12b, which are not exposed from the first end surface E1, by fine broken lines for the purpose of description.

As shown in the figure, in this configuration as well, the overlap of the first to fourth end surface resin portions 351e to 354e and the lead-out region R is made very small or eliminated, so that the above-mentioned effect of suppressing the increase of ESR can be obtained.

IV Other Embodiments

While the embodiments of the present disclosure have been described, the present disclosure is not limited to the embodiments described above, and it should be appreciated that the present disclosure may be variously modified.

For example, in the first embodiment, each of the first and second external electrodes 13a and 13b only needs to include at least the first conductive resin layer 151, and it does not necessarily include the second conductive resin layer 152 on the second main surface M2.

Further, the third embodiment shows the example in which the first to fourth end surface resin portions 351e to 354e are configured to be L-shaped, but the first to fourth end surface resin portions 351e to 354e are not limited to such a configuration and may have a substantially rectangular shape, for example.

Alternatively, in the third embodiment, the first to fourth main surface resin portions 351m to 354m may further be configured to have an L shape to cover the first to fourth the corners 111 to 114, respectively.

Further, the multi-layer ceramic capacitor according to each embodiment is not limited to be of a two-terminal type, and can also be configured to be of a three-terminal type.

Furthermore, the present disclosure is applicable not only to the multi-layer ceramic capacitors but also to any other multi-layer ceramic electronic components each including external electrodes. Examples of such multi-layer ceramic electronic components to which the present disclosure is applicable include a chip varistor, a chip thermistor, and a multi-layer inductor, in addition to the multi-layer ceramic capacitors.

It will be apparent to those skilled in the art that various modifications and variations can be made in the present disclosure without departing from the spirit or scope of the disclosure. Thus, it is intended that the present disclosure cover modifications and variations that come within the scope of the appended claims and their equivalents. In particular, it is explicitly contemplated that any part or whole of any two or more of the embodiments and their modifications described above can be combined and regarded within the scope of the present disclosure.

What is claimed is:

1. A multi-layer ceramic electronic component, comprising:
    a ceramic body having a substantially rectangular parallelepiped shape, the ceramic body including
        a first main surface and a second main surface that are perpendicular to a first axis,
        a pair of end surfaces perpendicular to a second axis orthogonal to the first axis,
        a first side surface and a second side surface that are perpendicular to a third axis orthogonal to the first axis and the second axis,
        a first corner that connects the first main surface, the first side surface, and one of the end surfaces,
        a second corner that connects the second main surface, the first side surface, and the end surface,
        a third corner that connects the first main surface, the second side surface, and the end surface,
        a fourth corner that connects the second main surface, the second side surface, and the end surface, and
        a plurality of internal electrodes laminated in a direction of the first axis or a direction of the third axis; and
    a pair of external electrodes each including
        a base layer that covers the end surface, and
        a first conductive resin layer that includes a first side surface resin portion disposed on the first side surface to cover the first corner and having an L-shaped planar shape extending from the first corner to the direction of the first axis and a direction of the second axis, and covers at least a part of the base layer.

2. The multi-layer ceramic electronic component according to claim 1, wherein
    each of the pair of external electrodes includes
        a second conductive resin layer that includes a second side surface resin portion disposed on the first side surface to cover the second corner and having an L-shaped planar shape extending from the second corner to the direction of the first axis and the direction of the second axis, and covers at least a part of the base layer, and
    the second conductive resin layer is apart from the first conductive resin layer in the direction of the first axis.

3. The multi-layer ceramic electronic component according to claim 1, wherein
    the first conductive resin layer includes
        a first end surface resin portion disposed on the end surface to cover the first corner and having an L-shaped planar shape extending from the first corner to the direction of the first axis and the direction of the third axis.

4. The multi-layer ceramic electronic component according to claim 1, wherein
    each of the pair of external electrodes further includes
        a third conductive resin layer that includes a third side surface resin portion disposed on the second side surface to cover the third corner and having an L-shaped planar shape extending from the third corner to the direction of the first axis and the direction of the second axis, and covers at least a part of the base layer, and
    the third conductive resin layer is apart from the first conductive resin layer in the direction of the third axis.

5. The multi-layer ceramic electronic component according to claim 4, wherein
    the first conductive resin layer includes
        a first end surface resin portion disposed on the end surface to cover the first corner and having an L-shaped planar shape extending from the first corner to the direction of the first axis and the direction of the third axis,
    the third conductive resin layer includes
        a third end surface resin portion disposed on the end surface to cover the third corner and having an L-shaped planar shape extending from the third corner to the direction of the first axis and the direction of the third axis, and
    the third end surface resin portion is apart from the first end surface resin portion in the direction of the third axis.

6. The multi-layer ceramic electronic component according to claim 1, wherein
    the base layer further includes a side surface base portion disposed on the first side surface, and
    the side surface base portion has a dimension in the direction of the second axis that is 50% or less of a dimension of the first side surface resin portion in the direction of the second axis.

7. The multi-layer ceramic electronic component according to claim 1, wherein
    each of the pair of external electrodes further includes a plating layer that covers the base layer and the first conductive resin layer.

8. A circuit board, comprising:
    a multi-layer ceramic electronic component; and
    a mounting substrate including a connection electrode,
    the multi-layer ceramic electronic component including
        a ceramic body having a substantially rectangular parallelepiped shape, the ceramic body including
            a first main surface and a second main surface that are perpendicular to a first axis,
            a pair of end surfaces perpendicular to a second axis orthogonal to the first axis,
            a first side surface and a second side surface that are perpendicular to a third axis orthogonal to the first axis and the second axis,
            a first corner that connects the first main surface, the first side surface, and one of the end surfaces,
            a second corner that connects the second main surface, the first side surface, and the end surface, a third corner that connects the first main surface, the second side surface, and the end surface, a fourth corner that connects the second main surface, the second side surface, and the end surface, and a plurality of internal electrodes laminated in a direction of the first axis or a direction of the third axis, and a pair of external electrodes each including a base layer that covers the end surface, and a first conductive resin layer that includes a first side surface resin portion disposed on the first side surface to cover the first corner and having an L-shaped planar shape extending from the first corner to the direction of the first axis and a direction of the second axis, and covers at least a part of the base layer.

\* \* \* \* \*